(12) United States Patent
Kim et al.

(10) Patent No.: US 11,662,859 B2
(45) Date of Patent: May 30, 2023

(54) TOUCH CIRCUIT FOR PREVENTING ERRONEOUS TOUCH DUE TO TEMPERATURE CHANGE, ELECTRONIC DEVICE COMPRISING TOUCH CIRCUIT, AND METHOD FOR OPERATING SAME

(71) Applicant: Samsung Electronics Co., Ltd., Gyeonggi-do (KR)

(72) Inventors: Changjin Kim, Gyeonggi-do (KR); Seungjae Lee, Gyeonggi-do (KR); Wonil Jang, Gyeonggi-do (KR); Taeyun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/432,214

(22) PCT Filed: Feb. 19, 2020

(86) PCT No.: PCT/KR2020/002428
§ 371 (c)(1),
(2) Date: Aug. 19, 2021

(87) PCT Pub. No.: WO2020/171607
PCT Pub. Date: Aug. 27, 2020

(65) Prior Publication Data
US 2022/0187978 A1    Jun. 16, 2022

(30) Foreign Application Priority Data

Feb. 19, 2019  (KR) .................. 10-2019-0019465
Aug. 6, 2019   (KR) .................. 10-2019-0095677

(51) Int. Cl.
*G06F 3/041*  (2006.01)
*G01K 3/00*   (2006.01)
*G06F 3/044*  (2006.01)

(52) U.S. Cl.
CPC ......... *G06F 3/04186* (2019.05); *G01K 3/005* (2013.01); *G06F 3/044* (2013.01)

(58) Field of Classification Search
CPC ...... G06F 3/04186; G06F 3/044; G06F 3/041; G01K 3/005
See application file for complete search history.

(56) References Cited

U.S. PATENT DOCUMENTS

| | | |
|---|---|---|
| 2013/0124140 A1 | 5/2013 | Jang et al. |
| 2015/0002459 A1 | 1/2015 | Watanabe et al. |

(Continued)

FOREIGN PATENT DOCUMENTS

| | | |
|---|---|---|
| JP | 2015-11558 A | 1/2015 |
| JP | 2016-58047 A | 4/2016 |

(Continued)

*Primary Examiner* — Adam R. Giesy
(74) *Attorney, Agent, or Firm* — Cha & Reiter, LLC

(57) ABSTRACT

According to certain embodiments, an electronic device may include a temperature sensor sensing temperature information, a processor, and a touch circuit. The touch circuit may identify that the temperature information is lower than or equal to a designated threshold temperature, and may identify whether values included in pieces of touch sensing information are within a designated range. Each of the pieces of touch sensing information may include multiple values corresponding to multiple nodes of the touch circuit. On the basis of the result of identifying whether the values included in the touch sensing information are within the designated range, the touch circuit may not output touch information associated with at least one first node having a value within the designated range, to the processor. Alternatively, the touch circuit may output touch information associated with at least one second node having a value outside the designated range, to the processor.

20 Claims, 16 Drawing Sheets

(56) References Cited

U.S. PATENT DOCUMENTS

| | | | |
|---|---|---|---|
| 2015/0253913 A1 | 9/2015 | Oh et al. | |
| 2015/0288214 A1 | 10/2015 | Borngraber | |
| 2016/0124573 A1 | 5/2016 | Rouaissia et al. | |
| 2019/0018543 A1* | 1/2019 | Yang | G06F 3/0418 |
| 2019/0034031 A1* | 1/2019 | Liu | G06F 3/0418 |

FOREIGN PATENT DOCUMENTS

| | | |
|---|---|---|
| KR | 10-2013-0053668 A | 5/2013 |
| KR | 10-2015-0105689 A | 9/2015 |
| KR | 10-2017-0087442 A | 7/2017 |

* cited by examiner

FIG.18

TOUCH CIRCUIT FOR PREVENTING ERRONEOUS TOUCH DUE TO TEMPERATURE CHANGE, ELECTRONIC DEVICE COMPRISING TOUCH CIRCUIT, AND METHOD FOR OPERATING SAME

CROSS REFERENCE TO RELATED APPLICATIONS

This application is a National Phase Entry of PCT International Application No. PCT/KR2020/002428, which was filed on Feb. 19, 2020, and claims a priority to Korean Patent Application No. 10-2019-0019465, which was filed on Feb. 19, 2019 and Korean Patent Application No. 10-2019-0095677, which was filed on Aug. 6, 2019, the contents of which are incorporated herein by reference.

TECHNICAL FIELD

The instant disclosure generally relates to a touch circuit capable of identifying a touch point, an electronic device including the touch circuit, and an operating method thereof.

BACKGROUND ART

Touchscreen-equipped electronic devices (e.g., smart phones, tablet PCs) have proliferated. A touchscreen may include a touch sensor including a plurality of electrodes and a touch sensor integrated circuit (IC) for processing the signals output from the plurality of electrodes. At least some of the plurality of electrodes may be used as transmission electrodes (TX electrodes), while others in the plurality of electrodes may be used as reception electrodes (RX electrodes). The electronic device may input driving signals to the transmission electrodes and may scan the signals output from each of the reception electrodes while the driving signals are input. The touch sensor IC processes the signals output from the reception electrodes and may identify a point touched by the user based on the processing result. The capacitance (e.g., mutual capacitance) of the electrode on (or near) the point touched by the user may be changed by contact (or proximity) with the user's body. Alternatively, the electronic device may include a self-capacitance type touch sensor IC, and the self-capacitance of the electrode may be changed by the user's contact (or proximity). The touch sensor IC may identify the position of the touch based on the value associated with the change in capacitance for the entire channel corresponding to the electrode and may output the identified touch position to a processor (e.g., an application processor).

DETAILED DESCRIPTION OF THE INVENTION

Technical Problem

In a low temperature environment, if the user touches a point on the touchscreen, the temperature of the touched point may increase due to the user's body temperature. The temperature of the touched point may be higher than the rest of the touchscreen. However, due to thermal conduction, the temperature of the touched point may then drop and revert to the temperature of the nearby portion of the touchscreen, i.e., the lower temperature. The temperature of the touched point may have a pattern in which it rises due to the finger's temperature and then drops.

The change in the temperature of the electrode may affect the value of capacitance change in the electrode. For example, a continuous drop in the temperature of an electrode may cause a continuous increase in the value of capacitance change in the electrode. In this case, since a change in the value of capacitance in the electrode is produced, the touch circuit may determine that a touch has been made on the electrode, although not actually so.

Certain embodiments may provide a touch circuit, an electronic device including the touch circuit, and an operation method thereof, which may prevent erroneous or false touches due to changes in temperature by determining that an identified capacitance change in a specific electrode is due to a change in temperature.

Technical Solution

According to certain embodiments, an electronic device may comprise a temperature sensor configured to sense temperature information of the electronic device, a processor, and a touch circuit. The touch circuit may be configured to identify that the temperature information sensed by the temperature sensor is lower than or equal to a designated threshold temperature and identify whether values included in a designated number of frames of touch sensing information are within a designated range based on the temperature information being lower than or equal to the designated threshold temperature. Each frame of the touch sensing information may include a plurality of values each corresponding to one of a plurality of nodes of the touch circuit. The touch circuit may be configured to refrain from outputting, to the processor, touch information associated with at least one first node having a value within the designated range among the plurality of nodes, based on a result of identifying whether the values included in the designated number of frames of touch sensing information are within the designated range. The touch circuit may be configured to output, to the processor, touch information associated with at least one second node having a value outside the designated range among the plurality of nodes, based on the result of identifying whether the values included in the designated number of frames of touch sensing information are within the designated range.

According to certain embodiments, a method of operation of an electronic device including a temperature sensor, a processor, and a touch circuit may comprise identifying that temperature information sensed by the temperature sensor is lower than or equal to a designated threshold temperature, identifying whether values included in a designated number of frames of touch sensing information are within a designated range based on the temperature information being lower than or equal to the designated threshold temperature, each frame of the touch sensing information including a plurality of values each corresponding to one of a plurality of nodes of the touch circuit, refraining from outputting, to the processor, touch information associated with at least one first node having a value within the designated range among the plurality of nodes, based on a result of identifying whether the values included in the designated number of frames of touch sensing information are within the designated range, and outputting, to the processor, touch information associated with at least one second node having a value outside the designated range among the plurality of nodes, based on the result of identifying whether the values included in the designated number of frames of touch sensing information are within the designated range.

Advantageous Effects

According to certain embodiments, it is possible to provide a touch circuit, an electronic device including the touch circuit, and an operation method thereof, which may determine that an identified capacitance change in a specific electrode is due to a change in temperature. Accordingly, it is possible to ignore erroneous touches due to changes in temperature.

BRIEF DESCRIPTION OF DRAWINGS

FIG. 18 illustrates per-node sensitivities of a baseline according to an embodiment.

MODE FOR CARRYING OUT THE INVENTION

Figure 1:
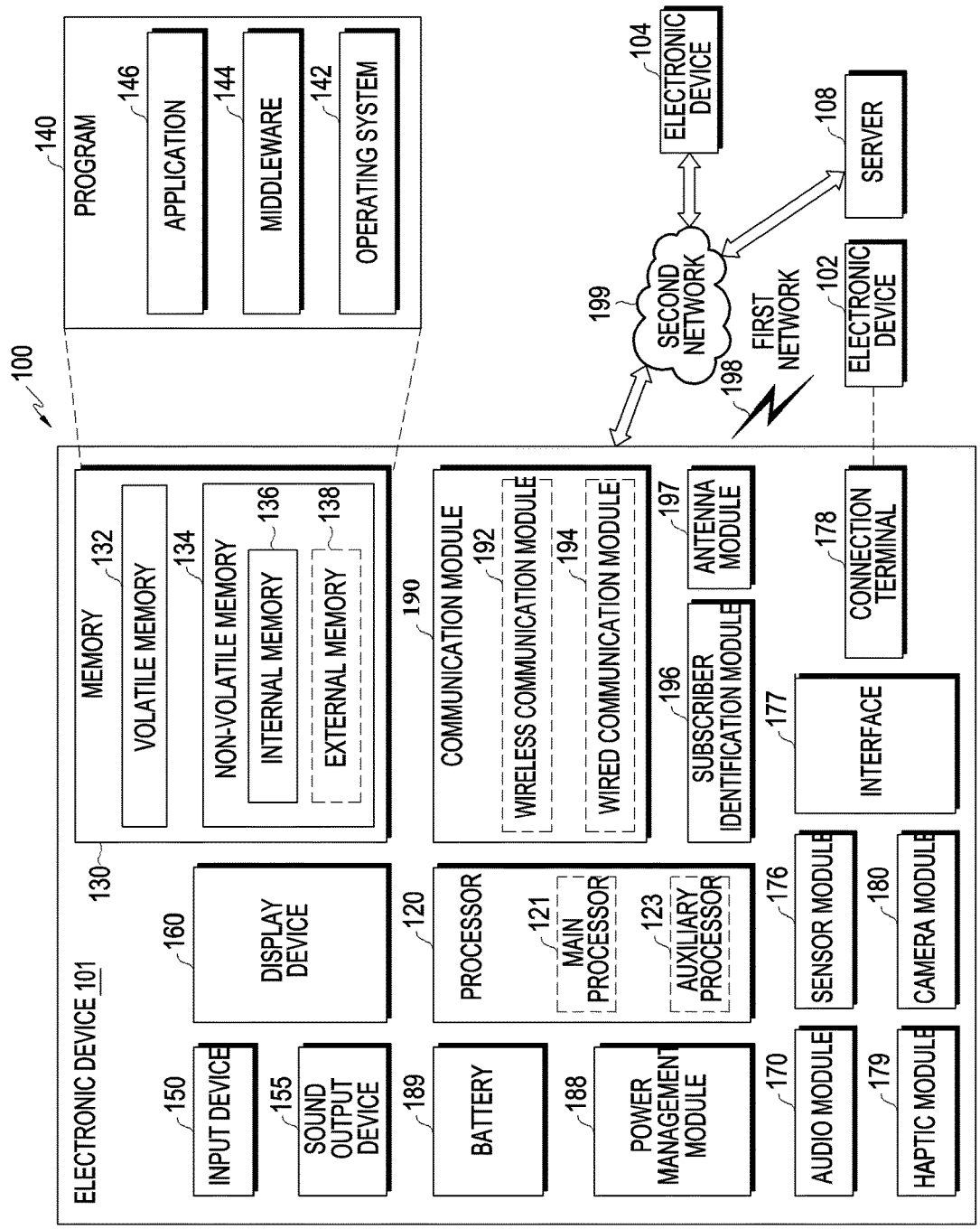
FIG. 1 is a view illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include a touch circuit adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) is separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
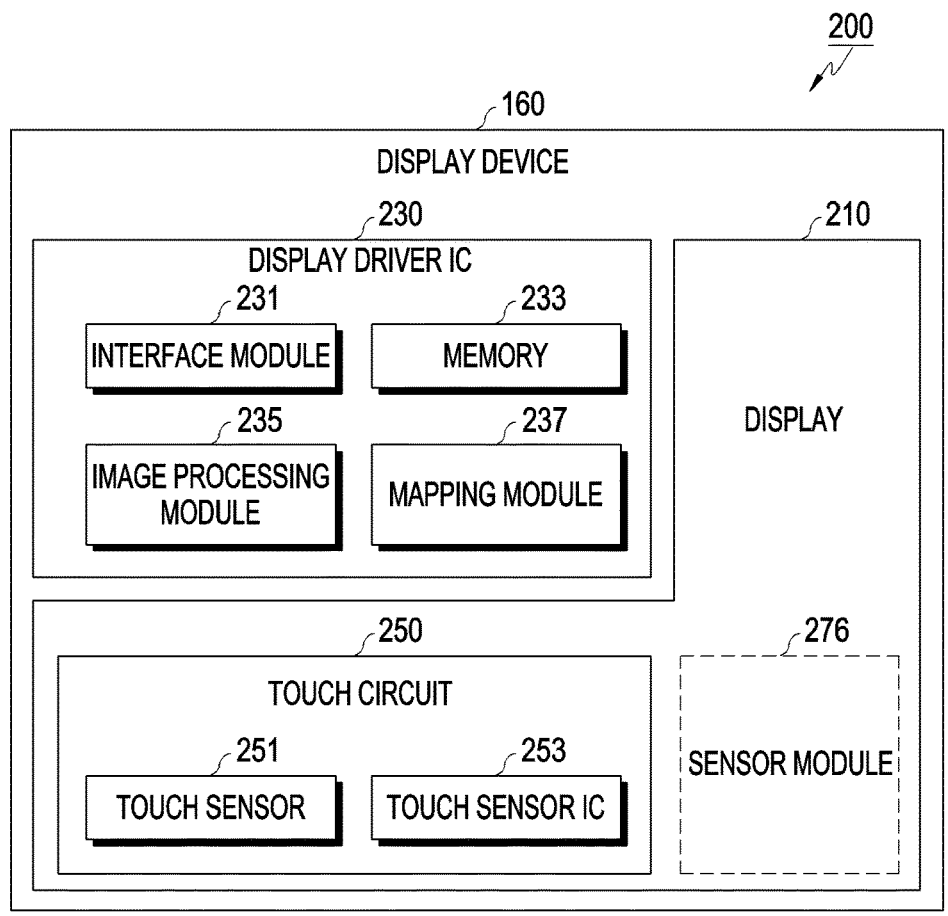
FIG. 2 is a block diagram illustrating a display device according to an embodiment.

FIG. 2 is a block diagram 200 illustrating the display device 160 according to an embodiment. Referring to FIG. 2, the display device 160 may include a display 210 and a display driver integrated circuit (DDI) 230 to control the display 110. The DDI 230 may include an interface module 231, memory 233 (e.g., buffer memory), an image processing module 235, and/or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the main processor 121. The DDI 230 may communicate, for example, with a touch circuit 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 135. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., text, image, or icon) corresponding to the image data may be displayed via the display 210.

According to an embodiment, the display device 160 may further include the touch circuit 250. The touch circuit 250 may include a touch sensor 251 and a touch sensor IC 253 to control the touch sensor 151. The touch sensor IC 253 may control the touch sensor 251 to sense a touch input or a hovering input with respect to a certain position on the display 210. To achieve this, for example, the touch sensor IC 253 may detect (e.g., measure) a change in a signal (e.g., voltage, quantity of light, resistance, or one or more electric charge values) corresponding to the certain position on the display 210. The touch sensor IC 253 may provide input information (e.g., position, area, pressure, or time) indicative of the touch input or the hovering input detected to the processor 120. According to an embodiment, at least part (e.g., the touch sensor IC 253) of the touch circuit 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 and a control circuit for the at least one sensor. In such a case, the at least one sensor and/or the control circuit for the at least one sensor may be embedded in one portion of a component (e.g., the display 210, the DDI 230, or the touch circuit 250)) of the display device 160. For example, when the sensor module 176 embedded in the display device 160 is a biometric sensor (e.g., fingerprint sensor), the biometric sensor may obtain biometric information (e.g., fingerprint image) corresponding to a touch input received via a portion of the display 210. As another example, when the sensor module 176 embedded in the display device 160 is a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
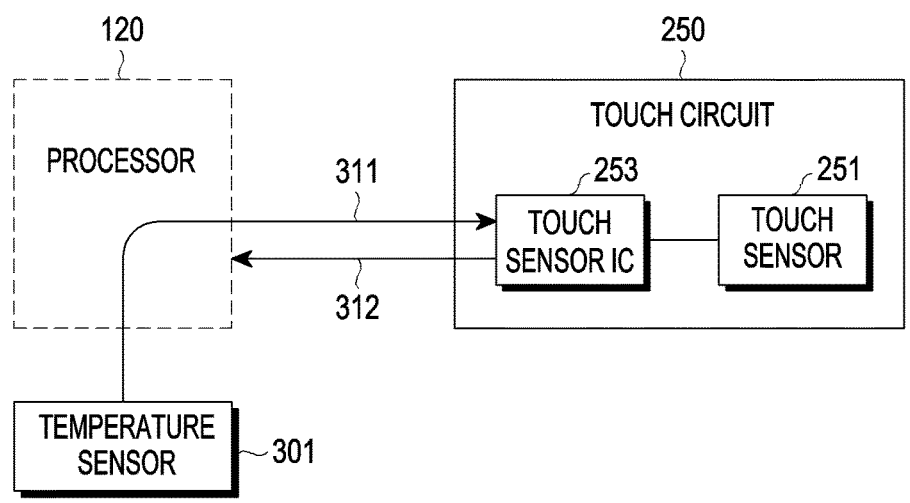
FIG. 3 is a block diagram illustrating an electronic device according to an embodiment.

FIG. 3 is a block diagram illustrating an electronic device according to an embodiment.

An electronic device 101 may include at least one of processor 120, touch circuit 250, and temperature sensor 301. The temperature sensor 301 may be included in the sensor module 176 of FIG. 1 and may sense temperature at least one point of the electronic device 101 and output temperature information. The position of the temperature sensor 301 is not limited to the embodiment shown, nor is the number thereof. When a plurality of temperature sensors 301 are implemented, the processor 120 may receive a plurality of temperature information from the plurality of temperature sensors. For example, the processor 120 may periodically receive temperature information from the temperature sensor 301, or may receive temperature information from the temperature sensor 301 if a designated condition is met.

In an embodiment, the processor 120 may transfer the temperature information 311 of the electronic device 101 to the touch sensor IC 253 included in the touch circuit 250. The processor 120 may transfer the temperature information 311 of the electronic device 101 to the touch sensor IC 253, e.g., at preset cycles. Alternatively, the processor 120 may be configured to identify whether the temperature information 311 meets a predetermined condition, e.g., a condition designated for entering a low temperature mode, and if it is identified that the condition is met, transfer the temperature information 311 to the touch sensor IC 253. For example, the designated condition may be a condition in which the temperature information 311 is less than or equal to a predetermined threshold temperature, but there is no limitation thereto as long as it is a condition capable of determining whether the temperature information is in a low temperature state. Alternatively, if it is identified that the temperature information 311 meets the predetermined condition, the processor 120 may transfer a signal including a command to operate the touch circuit 250 in the low temperature mode, instead of the temperature information 311. In certain embodiments, the temperature information 311 and the low temperature mode operation command may be transferred together or may be sequentially transferred separately. Operations corresponding to the low temperature mode are described below in further detail. In certain embodiments, the touch circuit 250 may receive the temperature information 311 directly from the temperature sensor 301 without the intervention of the processor 120.

According to an embodiment, the touch circuit 250 may include a touch sensor 251 and a touch sensor IC 253. The touch sensor 251 may include a plurality of electrodes. The touch sensor IC 253 may apply electrical signals to transmission electrodes that are at least some of the plurality of electrodes. The touch sensor IC 253 may measure the electrical signal output from each of the reception electrodes, which are at least some of the plurality of electrodes that are not the transmission electrodes, while applying the electrical signals to the transmission electrodes. Or the touch sensor IC 253 may measure self-capacitance for each of the electrodes. The touch circuit 250 may operate in a manner to measure self-capacitance or in a manner to measure mutual capacitance, but there is no limitation to the manners for measuring touch information. Each of the plurality of electrodes may correspond to one of a plurality of channels, and each of the crossings of the plurality of electrodes may correspond to a node. Alternatively, if the touch sensor 251 includes pad electrodes, each pad electrode may correspond to a node. For example, the touch sensor IC 253 may obtain a digital value into which an electrical signal has been converted, from each of the reception electrodes. The touch sensor IC 253 may identify a value corresponding to the capacitance change value for each channel, i.e., the sensitivity of each of is the plurality of nodes, based on the obtained value. The touch sensor IC 253 may identify the value, i.e., sensitivity, corresponding to the capacitance change value for each node, based on a difference between a baseline and the obtained raw data. The raw data may be the capacitance change value for each node. The baseline may include per-node values by which errors present in the raw data may be corrected. The baseline may be, e.g., a reference for capacitance change values on a per-node basis. The electronic device 101 may identify the sensitivity for each node based on the difference between the raw data and the baseline. Here, the sensitivity for each node may indicate the capacitance change value itself for each node or a value identified based on the capacitance change value. In other words, the sensitivity may correspond to the capacitance change value. The touch sensor IC 253 may identify the position of a touch using various types of data corresponding to the capacitance change value as well as the capacitance change value. The type of data handled by the touch sensor IC 253 is not limited. Information indicating a per-entire node sensitivity may be referred to as touch sensing information. In the disclosure, the touch sensing information may include a per-entire node capacitance change value and this may be referred to as a per-entire node sensitivity. Meanwhile, the touch sensing information may information including per-node values, and the per-node values may include at least one of per-node capacitance change amounts or per-node sensitivities in which case sensitivity may mean a value identified based on the capacitance change amount. The touch sensor IC 253 may identify touch information indicating the position of a touch based on the sensitivity of each of the nodes included in the touch sensing information, and transfer the identified touch information to the processor 120. The touch sensor IC 253 may additionally identify various information such as touch state, touch type, and touch sensitivity, and transfer the additionally identified information to the processor 120.

The touch sensor IC 253 may receive the temperature information 311 from the processor 120. The touch sensor IC 253 may identify that the temperature information 311 meets a designated condition to enter the low temperature mode. The touch sensor IC 253 may operate in the low temperature mode, e.g., based on identifying that the temperature information 311 is equal to or less than a predetermined threshold temperature. Alternatively, the touch sensor IC 253 may receive a command to operate in the low temperature mode from the processor 120 and may thereby operate in the low temperature mode. Meanwhile, the term "low temperature mode" may refer to when certain operations are performed by the touch sensor IC 253, and the touch sensor IC 253 may be configured to perform operations to exclude erroneous touches upon receiving a command or when a designated condition is met, without entering the mode. In the disclosure, entry into the low temperature mode may mean performing operations configured to exclude an erroneous touch, and release of the low temperature mode may mean stopping execution of such operations.

According to an embodiment, the touch sensor IC 253 may obtain touch sensing information based on raw data from the touch sensor 251. The touch sensing information may include a plurality of values, each of which corresponds to one of the nodes defined in the touch sensor 251, and the plurality of values may represent capacitance change amounts (or values corresponding to capacitance change amounts) corresponding to the corresponding nodes, and the type of data is not limited. The per-node values constituting the touch sensing information may be identified based on differences between the raw data and the baseline value.

The touch sensor IC 253 may use touch sensing information of a plurality of frames within a designated period and, if the sensitivity of a specific node among the plurality of frames is maintained below a designated threshold, disregard the touch at the node. The touch sensor IC 253 may measure the number of frames or identify touch sensing information within a designated time period. Here, when the touch sensor IC 253 disregards the touch, this may mean that the touch sensor IC 253 does not transfer information indicating the touch corresponding to the node to the processor 120. It may also be expressed as the touch sensor IC 253 rejecting the corresponding node or rejecting an erroneous touch indicating the corresponding node. Although a value (i.e., sensitivity) in excess of the threshold is detected from the rejected node after a designated period, the touch sensor IC 253 may disregard the touch to the node. When a value exceeding a threshold (i.e., threshold sensitivity) occurs within a designated period, the touch sensor IC 253 may transfer information 312 indicating the position (or coordinates) of the node, that is, information indicating the touch position to at least one of the processor 120 or DDI. The above-described threshold (or threshold sensitivity) is a value determined to distinguish whether the sensitivity identified from the node is by touch or by temperature change, which is described below in more detail.

In an embodiment, the touch sensor IC 253 may identify whether a designated expiration condition is met, and if the expiration condition is identified, release or exit the low temperature mode. Whether the expiration condition is met may be directly identified by the touch sensor IC 253 as described above, or may be identified by the processor 120 in which case the processor 120 may transfer a low temperature mode release command to the touch sensor IC 253.

Figure 4:
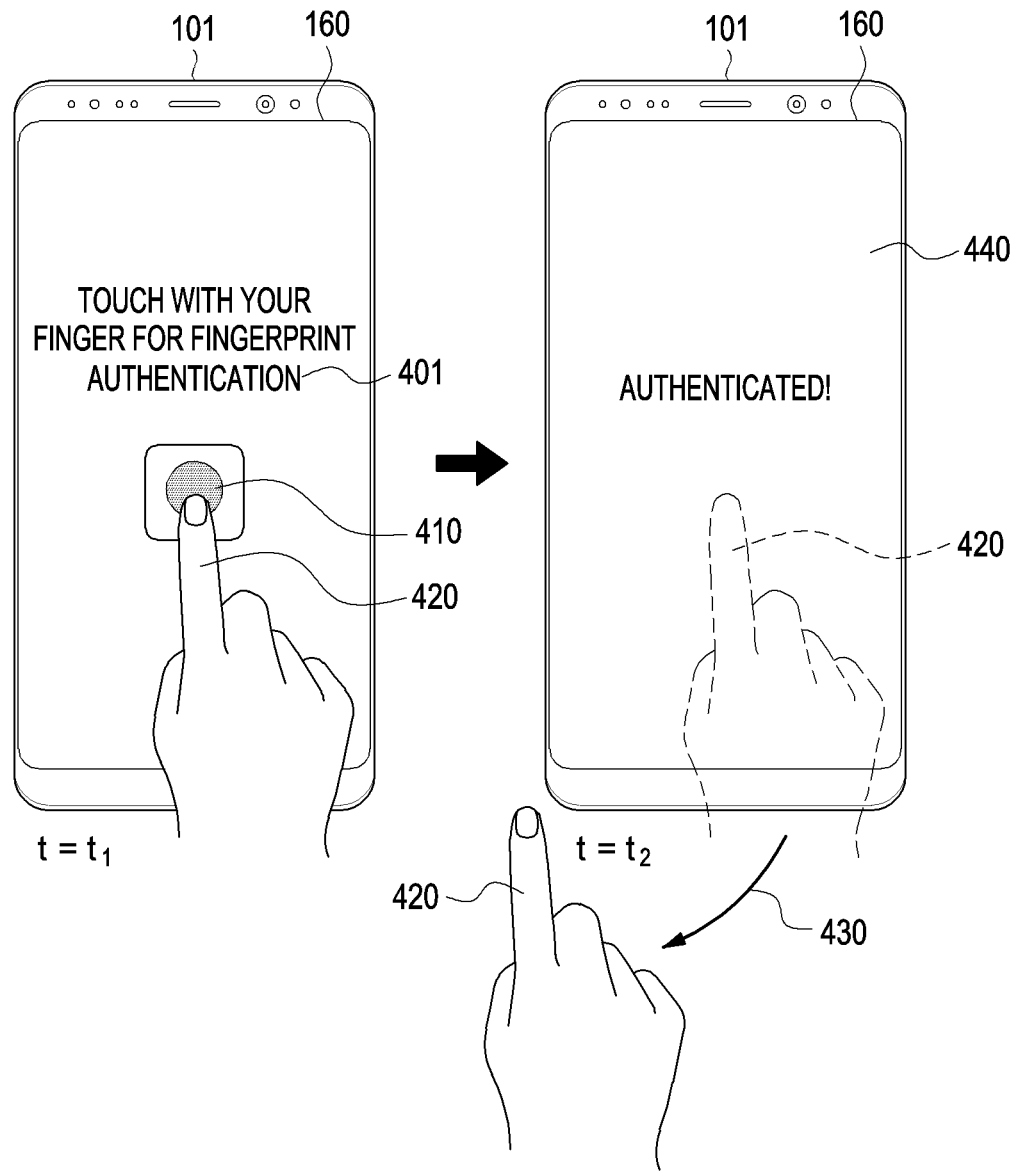
FIG. 4 illustrates a user's finger touch to an electronic device according to an embodiment.

FIG. 4 illustrates a user's finger touch to an electronic device according to an embodiment.

According to an embodiment, the electronic device 101 may provide a fingerprint authentication function. In the disclosure, when the electronic device 101 performs a specific operation or provides a specific function, this may mean that the processor 120 of the electronic device 101 provides the specific operation or the specific function or that the processor 120 controls other hardware to provide the specific operation or the specific function. Alternatively, when the electronic device 101 performs a specific operation or provides a specific function, this may mean that specific hardware (e.g., the touch circuit 250) performs the specific operation or provides the specific function without intervention of the processor 120. Alternatively, when the electronic device 101 performs a specific operation or provides a specific function, this may mean that an instruction to enable the processor 120 or specific hardware to provide the specific operation or specific function is stored in at least part of a storage media in the electronic device 101. According to an embodiment, the touch circuit 250 of the electronic device 101 may include a structure or device for fingerprint recognition.

The electronic device 101 may display an interface 401 for fingerprint input, and the interface 401 may include text prompting fingerprint input and an object indicating the location of the fingerprint sensor. Alternatively, the electronic device 101 may include a touch circuit 250 that enables fingerprint recognition in the entire area of the display, and in this case, the interface 401 may not include the object indicating the location of the fingerprint sensor. At a first time point t1, the user may input a touch to a first point of the display device 160 using her finger 420. The electronic device 101 may recognize the fingerprint corresponding to the touch and perform an authentication procedure on the recognized fingerprint. When it is identified that authentication is successful, the electronic device 101 may control the display device 160 to display an interface 440 indicating the success in authentication as illustrated in FIG. 4. The user may release the touch using the finger 420 by moving (430) the finger 420 at a second time point t2. In other words, the user's finger 420 may touch the first point 410 of the display device 160 from the first time point t1 to the second time point t2.

According to an embodiment, the processor 120 may transfer information about the occurrence of an event requiring a long-touch (or a single touch, or a multi-tap touch) to the touch circuit 250. For example, the processor 120 may transfer information about the occurrence of a fingerprint recognition event requiring a long-touch to the touch circuit 250. The touch is circuit 250 may be configured to operate in the low temperature mode if the information about the occurrence of an event requiring a long-touch is identified.

Figure 5A:
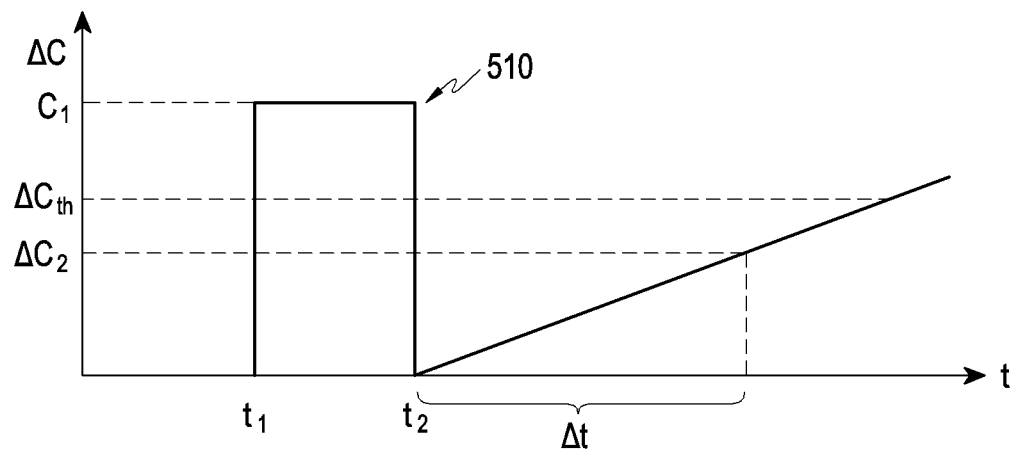
FIG. 5A illustrates time-series changes in temperature and a capacitance change amount at a touched point during a time between before and after a finger touch is made according to an embodiment.
Figure 5A:
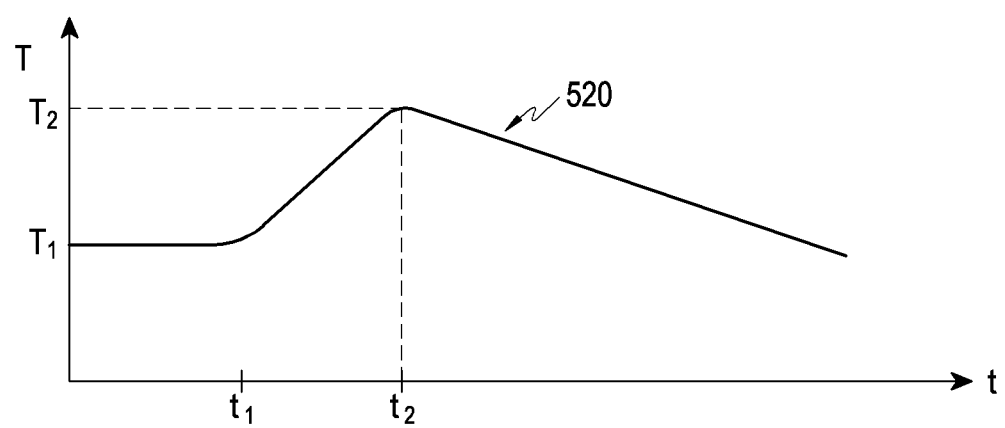

FIG. 5A illustrates time-series changes in temperature and a capacitance change amount at a touched point during a time between before and after a finger touch is made.

The first graph 510 in FIG. 5A illustrates the capacitance change amount $\Delta C$ (or value corresponding to the capacitance change amount ($\Delta C$) (or sensitivity) of the node of the touch circuit 250 corresponding to the first point 410 of the display device 160 of FIG. 4. The y-axis of the first graph 510 of FIG. 5A may be the capacitance change amount $\Delta C$, and accordingly, the y-axis may be the sensitivity. Here, the capacitance change amount $\Delta C$ may represent a difference between the value of the node corresponding to the first point 410 when touch input is made and the value of the node corresponding to the first point 410 at the baseline signal. The baseline signal may be a set of per-node reference values. In the trivial case, if no touch occurs, the capacitance change amount $\Delta C$ in all the nodes may be zero. In the instant disclosure, the capacitance of a specific electrode may mean either self-capacitance of a specific electrode or mutual capacitance between a specific electrode and another electrode, but is not limited thereto. Further, the capacitance at a specific node may mean the capacitance of an electrode corresponding to the specific node.

As illustrated in FIG. 5A, since the user did not touch the electronic device 101 during the period before the first time point t1, the capacitance change amount $\Delta C$ at the first electrode corresponding to the first point 410 may maintain substantially 0. As described above in connection with FIG. 4, the finger 420 may touch the first point 410 of the display device 160 between the first time point t1 and the second time point t2. Accordingly, the first graph 510 may have a capacitance change amount of $\Delta C1$ between the first time point t1 and the second time point t2. In the case of the touch by the finger 420, the capacitance change amount may sharply increase as in the first graph 510 at the first time point t1. The capacitance change amount of $\Delta C1$ is maintained between the first time point t1 and the second time point t2 when the touch of the finger 420 is maintained, or may be changed by a temperature rise or a tiny change in the user's touch, but this may be a slight change in size compared to the entire size of $\Delta C1$.

Meanwhile, referring to the second graph 520 indicating the temperature at the first point 410, the first point 410 may have a temperature of T1 before the first time point t1, i.e., before the finger 420 touches. T1 may be a relatively low temperature (e.g., −10° C., which is an outdoor temperature in winter). The body temperature of the finger 420 may be higher than T1, and heat may be conducted from the finger 420 to the first point 410 during the period from the first time point t1 to the second time point a. The temperature of the first point 410 may increase during the period from the first time point t1 to the second time point t2 due to heat conduction. The temperature of the first point 410 at the second time point t2 may be T2. Meanwhile, after the second time point t2, heat may be conducted from the first point 410 to the surrounding area, and the temperature of the first point 410 may decrease.

Meanwhile, the capacitance change amount $\Delta C$ in the first electrode corresponding to the first point 410 may be affected by the decrease in temperature. As illustrated in FIG. 5A, it may be identified that the first graph 510 increases during the post-second time point t2 period when the temperature decreases. The decrease in temperature may affect the capacitance of the electrode. An increase rate of the first graph 510 after the second time point t2 may be smaller than an increase rate of the first graph 510 at the first time point t1.

As described above, it may be identified that the capacitance change amount ΔC in the first electrode corresponding to the first point 410 during the period after the second time point t2 has a non-zero value and increases even though no touch has occurred. Accordingly, since the electronic device 101 may determine that a touch has occurred again at the first point 410, it is required to prevent such an erroneous touch.

According to certain embodiments, the electronic device 101 (e.g., the touch circuit 250) may identify whether the capacitance change amount falls within a preset range (e.g., a range less than or equal to a preset threshold change amount ΔCth) for a designated period Δt. For example, in the example of FIG. 5A, it may be identified that the first graph 510 increases up to ΔC2 during the designated period Δt, but does not exceed the preset threshold change amount ΔCth. The touch circuit 250 may identify that the first graph 510, that is, the capacitance change amount of the first electrode, falls within the preset range for the designated period Δt, and reject the touch to the first point 410. In other words, the touch circuit 250 may not output a signal, indicating that the first point 410 has occurred, to the processor 120. The threshold change amount ΔCth may be set to a value by which it may be identified whether the change in capacitance is by a touch or by a temperature change considering the change rate of temperature, and in certain embodiments, the threshold change amount may be a single value and may be set to be different values based on different temperatures of the electronic device 101. Meanwhile, as described above, the capacitance change amount may be referred to as sensitivity, and accordingly, when the sensitivity at a specific node is less than or equal to a threshold sensitivity, is the touch circuit 250 may reject the touch to the corresponding node.

Figure 5B:
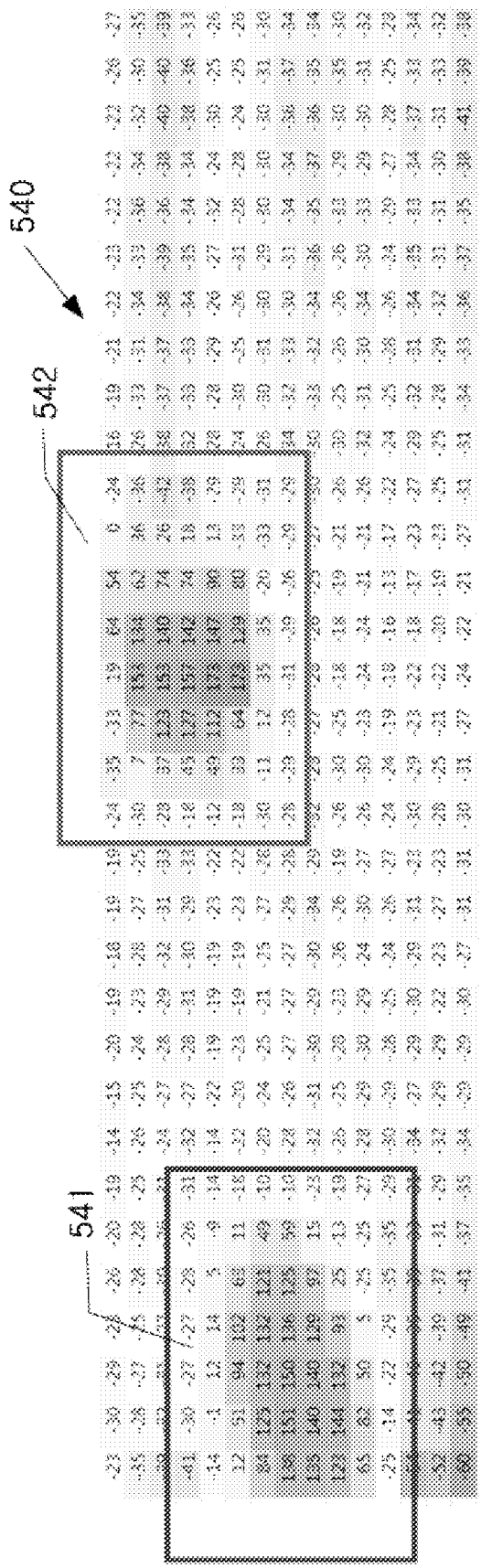
FIG. 5B illustrates per-node sensitivities according to an embodiment.

FIG. 5B illustrates per-node sensitivities according to an embodiment.

In FIG. 5B, a first node group 541 may include nodes whose sensitivity has arisen due to a temperature drop into a low temperature state. A second node group 542 may include nodes whose sensitivity has arisen due to an actual touch. As illustrated in FIG. 5B, the first node group 541 and the second node group 542 may be similar in shape or size, so it may be difficult to identify and exclude false touch caused by a temperature drop, by shape or size. The electronic device 101 may disregard the false touch caused by the temperature drop in the above-described manner.

Figure 6:
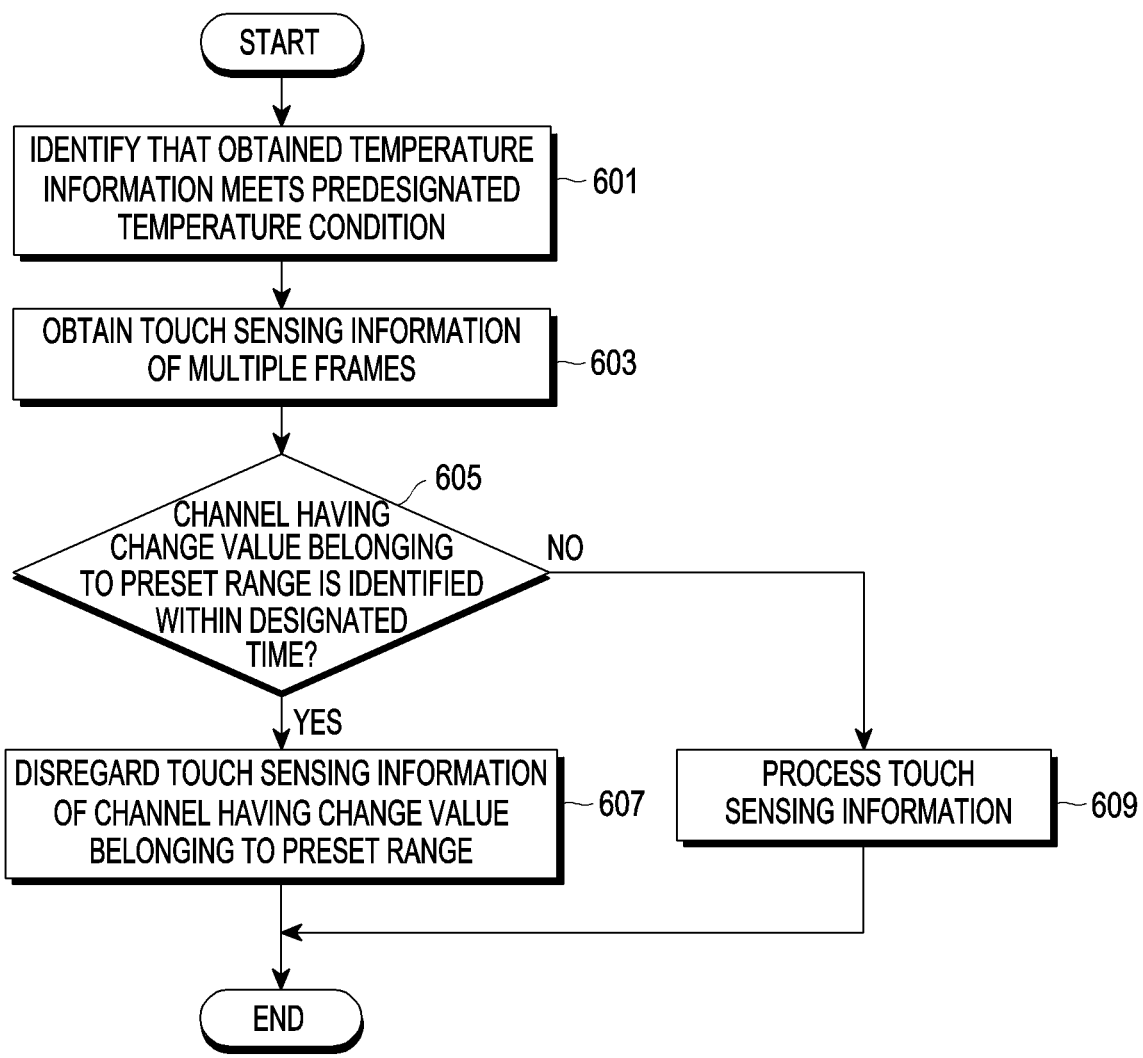
FIG. 6 is a flowchart illustrating an operation method of an electronic device according to an embodiment.
Figure 7A:
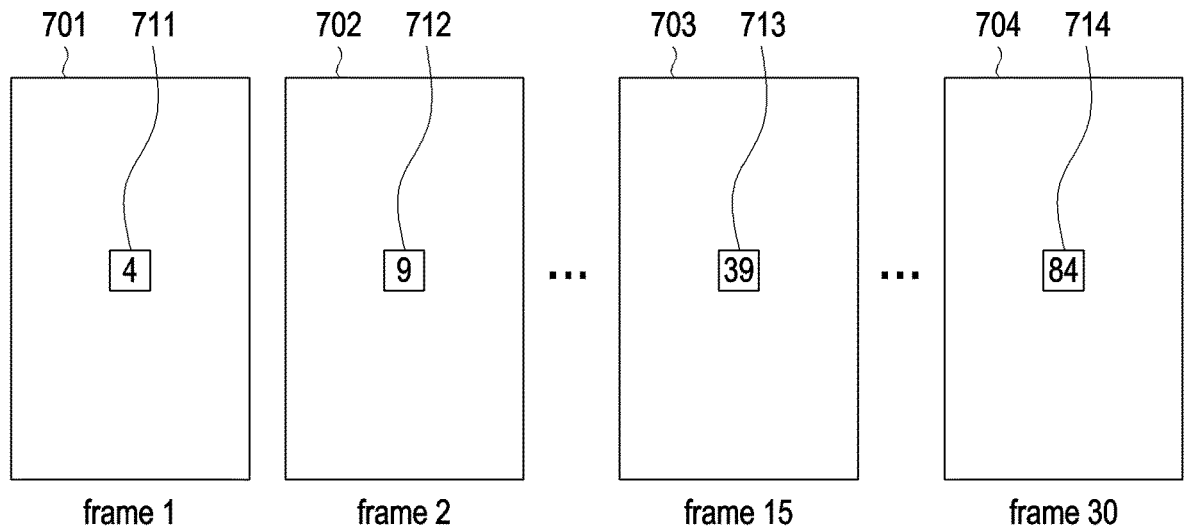
FIG. 7A illustrates an example of touch sensing information identified by a touch circuit according to an embodiment.
Figure 7B:
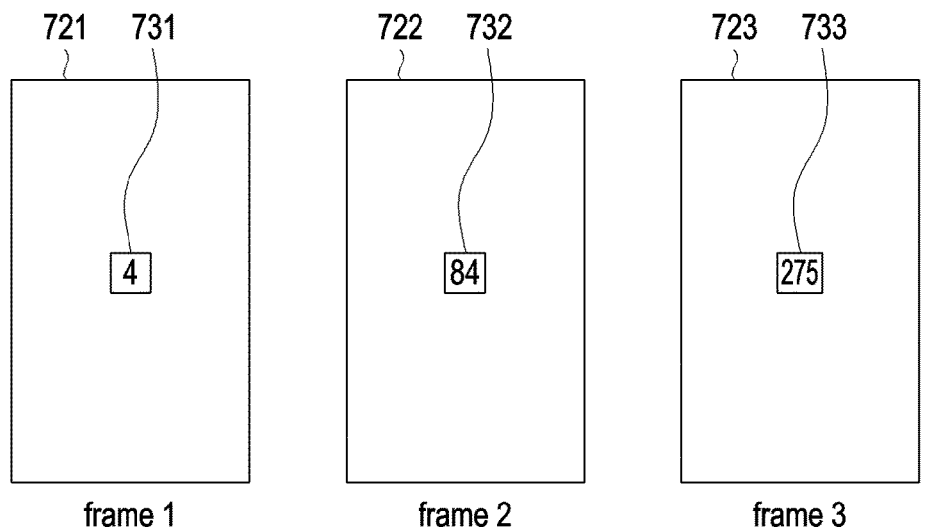
FIG. 7B illustrates another example of touch sensing information identified by a touch circuit according to an embodiment.

FIG. 6 is a flowchart illustrating an operation method of an electronic device according to an embodiment. The embodiment of FIG. 6 is described with reference to FIGS. 7A and 7B. FIG. 7A illustrates an example of touch sensing information identified by a touch circuit according to an embodiment. FIG. 7B illustrates another example of touch sensing information identified by a touch circuit according to an embodiment.

According to an embodiment, the electronic device 101 (e.g., the touch circuit 250) may identify that obtained temperature information meets a predetermined temperature condition in operation 601. For example, the touch circuit 250 may obtain temperature information through the processor 120 or may directly obtain temperature information from the temperature sensor 301. In this case, the touch circuit 250 may directly identify whether the temperature condition is met. For example, the touch circuit 250 may load information regarding a threshold temperature, compare it with the obtained temperature information, and if the temperature information is lower than the threshold temperature as a result of the comparison, identify that the temperature condition is met. Alternatively, the processor 120 may compare the obtained temperature information with the threshold temperature and identify whether the temperature condition is met based on the comparison result. If it is identified that the temperature condition is met, the processor 120 may transfer the temperature condition to the touch circuit 250. Alternatively, the processor 120 may transfer a command to perform the low temperature mode operation to the touch circuit 250.

In operation 603, the electronic device 101 (e.g., the touch circuit 250) may obtain touch sensing information in a plurality of frames. For example, the electronic device 101 may determine a plurality of frames of touch sensing information 701, 702, 703, and 704 as illustrated in FIG. 7A. As described above, first touch sensing information 701 may include per-node is sensitivities. For ease of description, FIG. 7A illustrates 4 which is the sensitivity at a first node. The sensitivity 711 at the node may be the difference between the raw data and the baseline signal of the first node, or a value based on the difference. Although not shown, the touch sensing information 701 may include sensitivities at all of the nodes other than the first node. The unit of counting individual touch sensing information may be referred to as a frame. The sensitivity 711 of the first node in the first touch sensing information 701 may be 4, the sensitivity 712 of the first node in the second touch sensing information 702 may be 9, the sensitivity 713 of the first node in the 15th touch sensing information 703 may be 39, and the sensitivity 714 of the first node in the 30th touch sensing information 704 may be 84.

In operation 605, the electronic device 101 (e.g., the touch circuit 250) may identify whether there is a node having sensitivity exceeding a preset threshold sensitivity (i.e., a threshold capacitance change value) within a designated time. As illustrated in FIG. 5A, the electronic device 101 may identify whether there is a node having sensitivity exceeding the threshold sensitivity within the designated time from a time point when the sensitivity is detected substantially at zero. Alternatively, the electronic device 101 may also identify a sensitivity change rate over time. If it is determined that there is no node having sensitivity exceeding the threshold sensitivity within the designated time, the electronic device 101 (e.g., the touch circuit 250) may disregard the touch sensing information for the node, i.e., output no touch information, in operation 607. If it is determined that there is a node having sensitivity exceeding the threshold sensitivity within the designated time, the electronic device 101 (e.g., the touch circuit 250) may process the touch sensing information and may identify touch information (e.g., the coordinates of the node) identified based on the touch sensing information in operation 609. According to an embodiment, if the touch information has sensitivity exceeding the threshold sensitivity within the designated time, the electronic device 101 may process the touch information without limitation to the position of the area of generation. Alternatively, the electronic device 101 may be configured to process touch information generated in a designated area while having sensitivity exceeding the threshold sensitivity within the designated time. For example, the electronic device 101 may be configured to process touch information having sensitivity exceeding the threshold sensitivity while occurring in an area where fingerprint recognition is requested.

For example, the designated time may be 15 frames, and the preset range may be a range in which the node's sensitivity is 60 or less. The touch circuit 250 may identify that there is no node having a sensitivity of 60 or more within 15 frames from the plurality of touch sensing information 701, 702, and 703 obtained in FIG. 7A. Accordingly, the touch circuit 250 may reject the first node, and may not output a signal indicating that a touch occurs at the first node to the processor 120. Further, even when a node having a sensitivity exceeding the threshold sensitivity of 60, i.e., the first node, is detected in the touch sensing information 704 of the thirtieth frame, the touch circuit 250 may maintain the rejection of the first node. In other words, the touch circuit 250 may not output a signal indicating that a touch occurs at the first node to the processor 120. For example, the touch circuit 250 may maintain the rejection until the value at the first node (i.e., the capacitance change value (or sensitivity) at the first node) resets to substantially zero.

Meanwhile, in another example, the touch circuit 250 may obtain a plurality of touch sensing information 721, 722, and 723 as illustrated in FIG. 7B. In the first touch sensing information 721, the sensitivity 731 of the first node may be 4, in the second touch sensing information 722, the sensitivity 732 of the first node may be 84, and in the third touch sensing information 723, the sensitivity 733 of the first node may be 275. The touch circuit 250 may identify that the sensitivity at the first node exceeds the threshold sensitivity of 60 within the second frame, that is, the fifteenth frame, and may not reject the first node. In this case, the touch circuit 250 may transfer information indicating that a touch has occurred at the first node, that is, information indicating the coordinates of the first node, to the processor 120.

Figure 8:
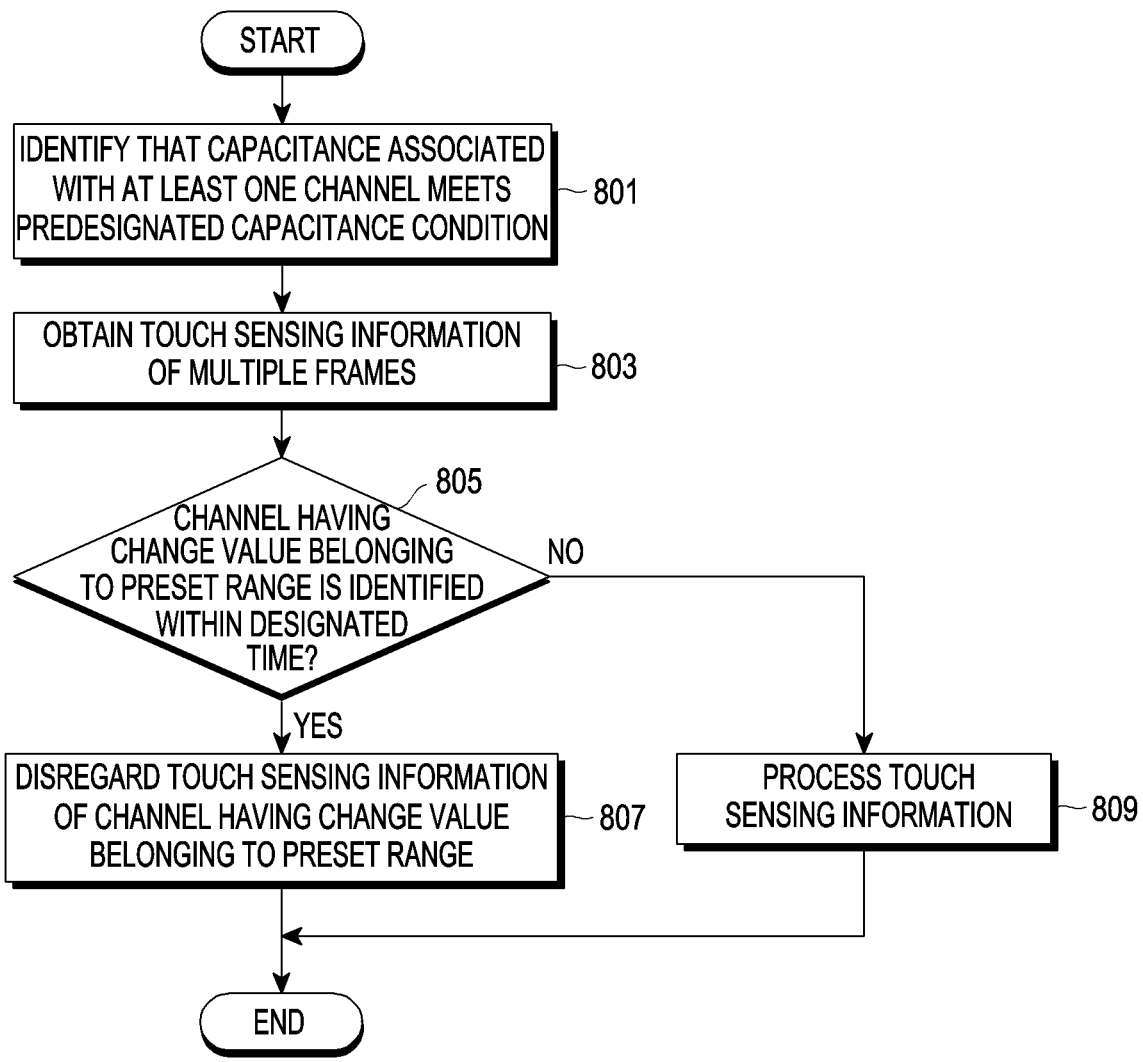
FIG. 8 is a flowchart illustrating an operation method of an electronic device according to an embodiment.
Figure 9:
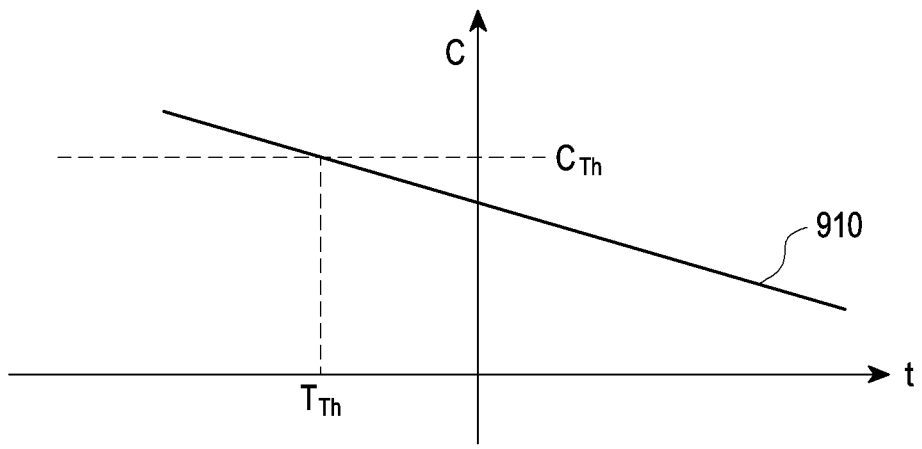
FIG. 9 illustrates a correlation between temperature and electrode-associated capacitance according to an embodiment.

FIG. 8 is a flowchart illustrating an operation method of an electronic device according to an embodiment. The embodiment of FIG. 8 is described with reference to FIG. 9. FIG. 9 illustrates a correlation between temperature and electrode-associated capacitance according to an embodiment.

According to an embodiment, in operation 801, the electronic device (e.g., the touch circuit 250) may identify that capacitance associated with at least one channel meets a predetermined capacitance condition. As illustrated in FIG. 9, the capacitance 910 associated with a specific electrode, e.g., self-capacitance or mutual capacitance of the specific electrode, has a correlation that it increases in magnitude as the temperature decreases. Although in FIG. 9 the capacitance is shown as if it is linearly changed, this is merely a diagram for explaining the correlation, and the capacitance may not be changed linearly. At a threshold temperature Tth which is classified as relatively low, the capacitance C of the electrode may have a threshold capacitance CTh. Accordingly, the touch circuit 250 may operate in the low temperature mode based on whether the capacitance of the electrode meets a designated capacitance condition even without using temperature information. For example, the touch circuit 250 may operate in the low temperature mode based on the capacitance measured at any electrode being equal to or greater than the threshold capacitance.

In operation 803, the electronic device 101 (e.g., the touch circuit 250) may obtain touch sensing information in a plurality of frames. In operation 805, the electronic device 101 (e.g., the touch circuit 250) may identify whether there is a node having sensitivity exceeding a preset threshold sensitivity within a designated time. If it is determined that there is no node having sensitivity exceeding the threshold sensitivity within the designated time, the electronic device 101 (e.g., the touch circuit 250) may disregard the touch sensing information for the node having sensitivity equal to or less than the threshold sensitivity in operation 807. If it is determined that there is a node having sensitivity exceeding the threshold sensitivity within the designated time, the electronic device 101 (e.g., the touch circuit 250) may process touch sensing information in operation 809. In other words, without rejecting a specific portion of the touchscreen, if a touch occurs, the touch circuit 250 may transfer information about the position where the touch occurs to the processor 120.

In an embodiment, the touch circuit 250 may be configured to perform operations in the low temperature mode based on identifying that the temperature information meets a designated temperature condition and identifying that the capacitance information meets a designated capacitance condition.

Figure 10:
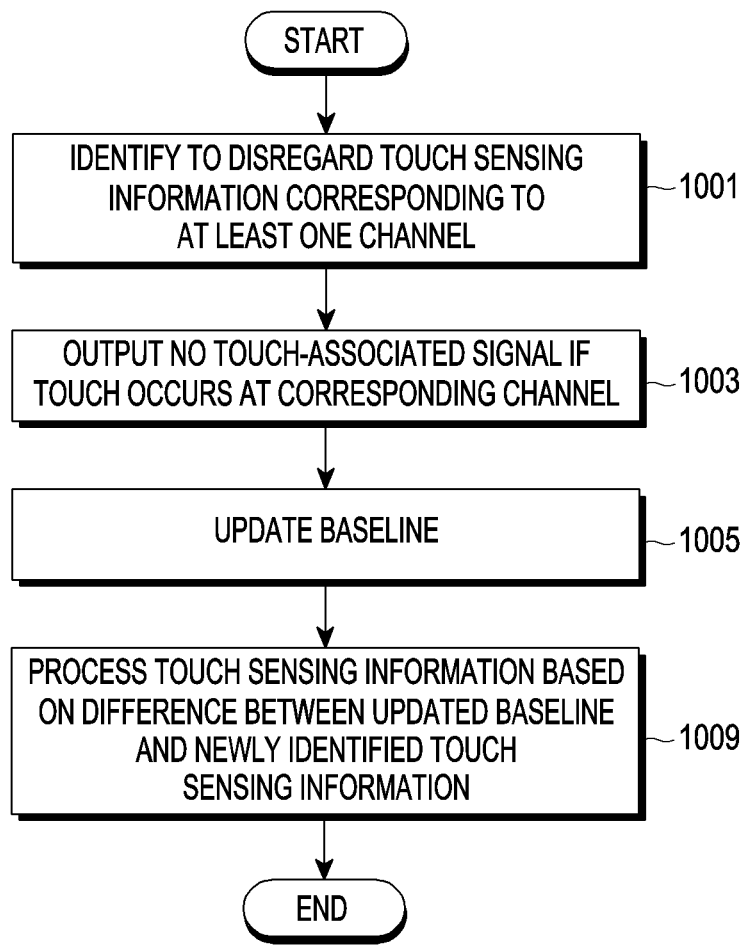
FIG. 10 is a flowchart illustrating an operation method of an electronic device according to an embodiment.
Figure 11:
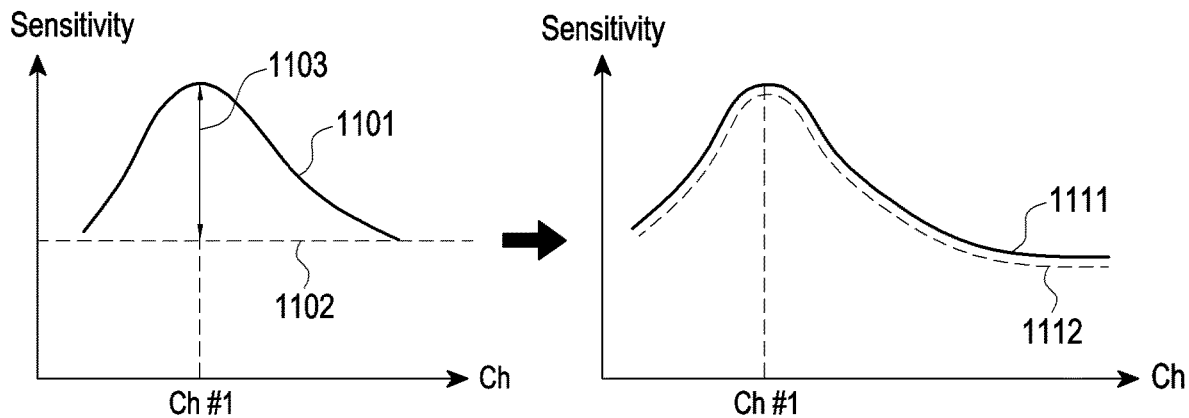
FIG. 11 is a view illustrating a baseline update according to an embodiment.

FIG. 10 is a flowchart illustrating an operation method of an electronic device according to an embodiment. FIG. 10 is described with reference to FIG. 11. FIG. 11 is a view illustrating a baseline update according to an embodiment.

According to an embodiment, the electronic device 101 (e.g., the touch circuit 250) may identify to disregard touch sensing information corresponding to at least one channel in operation 1001. For example, as described above, the touch circuit 250 may identify that a change value belonging to a preset range is detected from the first node within a designated time. Accordingly, it may be identified that the touch sensing information corresponding to the first node will be disregarded. In operation 1003, the electronic device 101 (e.g., the touch circuit 250) may not output a touch related signal if a touch occurs at the corresponding channel.

The electronic device 101 (e.g., the touch circuit 250) may update the baseline in operation 1005. In operation 1007, the electronic device 101 (e.g., the touch circuit 250) may process touch sensing information based on a difference between the updated baseline and newly identified touch sensing information. For example, referring to FIG. 11, the touch circuit 250 stores a first baseline 1102, and if first raw data 1101 is input, the touch circuit 250 may identify the sensitivity of each channel based on the difference 1103 between the first raw data 1101 and the first baseline 1102. The baseline may ideally have a value of 0 for all the channels, but it is assumed that the first baseline 1102 is used for error correction. For example, the difference 1103 between the first raw data 1101 and the first baseline 1102 may occur at the first channel Ch #1 due to a change in the temperature of the first channel Ch #1. In this case, the touch circuit 250 may reject the touch at the first channel Ch #1 even when the difference 1103 between the first raw data 1101 and the first baseline 1102 occurs. The touch circuit 250 may update the baseline from the first baseline 1102 to a second baseline 1112. In an embodiment, the touch circuit 250 may reject erroneous touches and maintain the rejection until the data in the corresponding node resets to substantially zero. If no more erroneous touches are detected after rejecting the erroneous touches, such that the operation mode of the touch circuit switches into an idle mode, the touch circuit 250 may update the baseline.

For example, the touch circuit 250 may update the second baseline 1112 based on the first raw data 1101. Meanwhile, the touch circuit 250 may obtain second raw data 1111. The touch circuit 250 may identify the capacitance change amount based on the difference between the second raw data 1111 and the second baseline 1112, and in this case, the touch circuit 250 may identify that the capacitance change amount has a value substantially close to zero. Accordingly, even when the touch circuit 250 would not have rejected the first channel Ch #1 using the first baseline 1102, if the second raw data 1111 has a relatively high value at the first channel Ch #1, the touch circuit 250 may identify that no touch has occurred at the first channel (Ch #1) using the second baseline 1112. Further, if the user touches the electrode portion of the first channel Ch #1, the touch circuit 250 does not reject the first channel Ch #1. Thus, the touch circuit 250 may transfer information indicating that a touch has occurred at the first channel Ch #1 to the processor 120.

Figure 12:
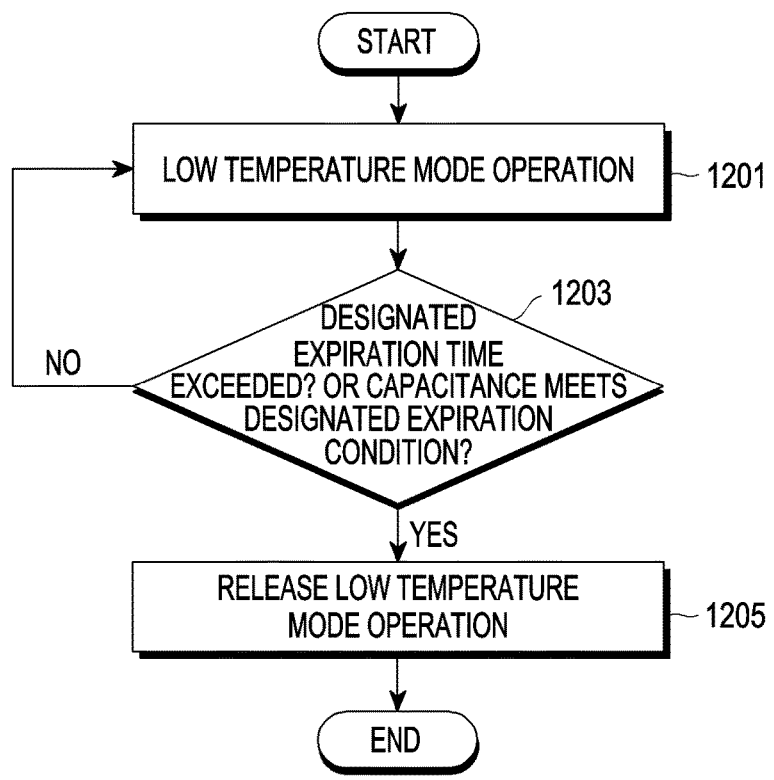
FIG. 12 is a flowchart illustrating an operation method of an electronic device according to an embodiment.

FIG. 12 is a flowchart illustrating an operation method of an electronic device according to an embodiment.

According to an embodiment, the electronic device 101 (e.g., the touch circuit 250) may operate in the low temperature mode in operation 1201. As described above, the electronic device 101 may operate in the low temperature mode based on the temperature meeting the designated temperature condition and/or the capacitance of any electrode of the touch circuit 250 meeting the designated capacitance condition. For example, the touch circuit 250 may reject nodes having change values equal to or less than the threshold capacitance change value within the designated period. The touch circuit 250 may maintain the node rejection, or update the baseline signal at the nodes after the node rejection. When the baseline signal is updated, the touch circuit 250 may determine whether there is a touch based on the difference between the raw data and the updated baseline signal.

In operation 1203, the electronic device 101 (e.g., the touch circuit 250) may determine whether a designated expiration time is exceeded or whether the capacitance meets the designated capacitance expiration condition and may process both the conditions with an OR conditional statement. If it is determined that either one of the two conditions is met, the electronic device 101 (e.g., the touch circuit 250) may release the low temperature mode in operation 1205. For example, the touch circuit 250 may release the low temperature mode if a designated expiration time (e.g., 1 minute) elapses after the low temperature mode starts. Alternatively, if a low temperature mode release condition (e.g., the current temperature is greater than or equal to the threshold temperature) is detected, and an expiration time (e.g., 1 minute) elapses after the time of detecting the condition, the electronic device 101 may release the low temperature mode. Alternatively, the touch circuit 250 may stop the low temperature mode operation if the capacitance of any electrode does not meet the designated capacitance condition (e.g., the threshold capacitance value or more). After the low temperature mode is released, the electronic device 101 (e.g., the touch circuit 250) may initialize the temperature information (e.g., set to a value of 0×80).

According to an embodiment, the electronic device 101 (e.g., the touch sensor IC 253) may identify information about the current temperature. If it is identified that the current temperature exceeds the preset threshold temperature, the electronic device 101 may release the low temperature mode.

Figure 13A:
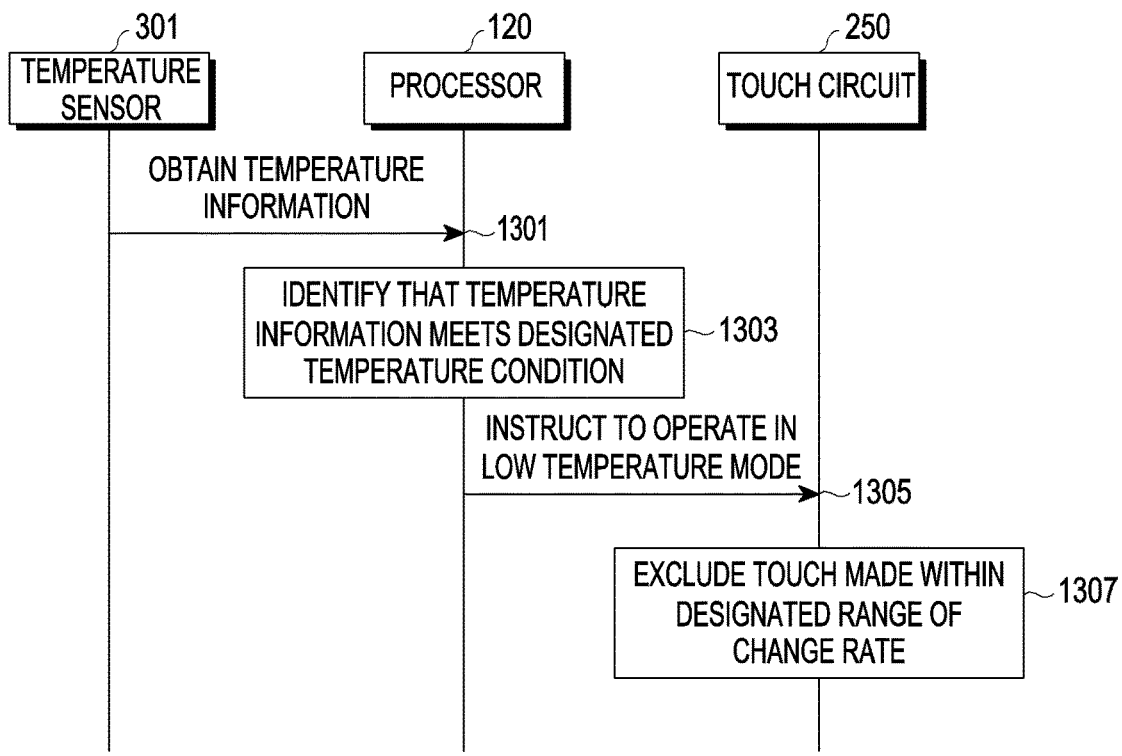
FIG. 13A is a flowchart illustrating an operation method of an electronic device according to an embodiment.

FIG. 13A is a flowchart illustrating an operation method of an electronic device according to an embodiment.

In operation 1301, the processor 120 may obtain temperature information from the temperature sensor 301. In operation 1303, the processor 120 may identify that the temperature information meets a designated temperature condition. For example, the processor 120 may identify that the current temperature information is less than or equal to a designated threshold temperature. In operation 1305, the processor 120 may instruct the touch circuit 250 to operate in the low temperature mode. The processor 120 may transfer a command including the designated information to the touch circuit 250. In operation 1307, the touch circuit 250 may exclude a touch occurring within a change rate of a designated range. The rate of change may represent a rate of change of the capacitance change over time. As described with reference to FIG. 5A, the change rate of the capacitance change due to the actual touch may be relatively high, and the change rate of the capacitance change due to the temperature change may be relatively low. The touch circuit 250 may identify the change rate, over time, of the value included in a plurality of touch sensing information, reject nodes having a change rate equal to or less than a threshold and, for nodes whose change rate exceed the threshold, transfer information indicating the coordinates of the nodes to the processor 120.

Figure 13B:
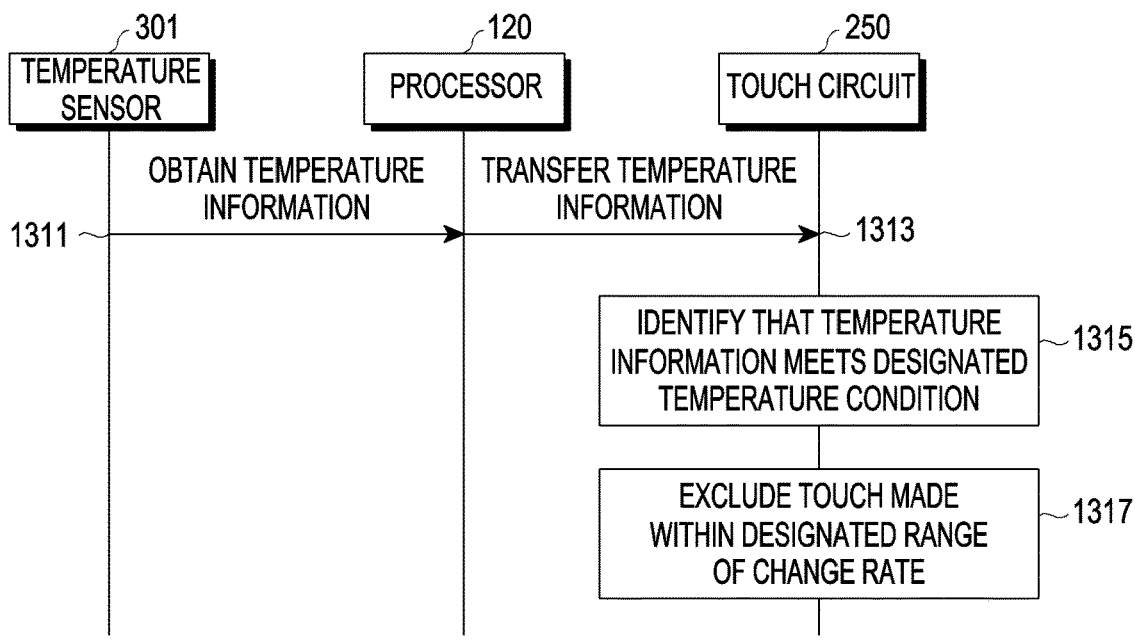
FIG. 13B is a flowchart illustrating an operation method of an electronic device according to an embodiment.

FIG. 13B is a flowchart illustrating an operation method of an electronic device according to an embodiment.

According to an embodiment, in operation 1311, the processor 120 may obtain temperature information from the temperature sensor 301. The processor 120 may transfer the temperature information to the touch circuit 250 in operation 1313. The processor 120 may transfer the temperature information to the touch circuit 250 if a designated event is detected or a request is received from the touch circuit 250. Alternatively, the processor 120 may transfer the temperature information to the touch circuit 250 periodically. Alternatively, the touch circuit 250 may directly receive temperature information from the temperature sensor 301. In operation 1315, the touch circuit 250 may identify that the temperature information meets a designated temperature condition. In operation 1317, the touch circuit 250 may exclude a touch occurring within a change rate of a designated range.

Figure 14:
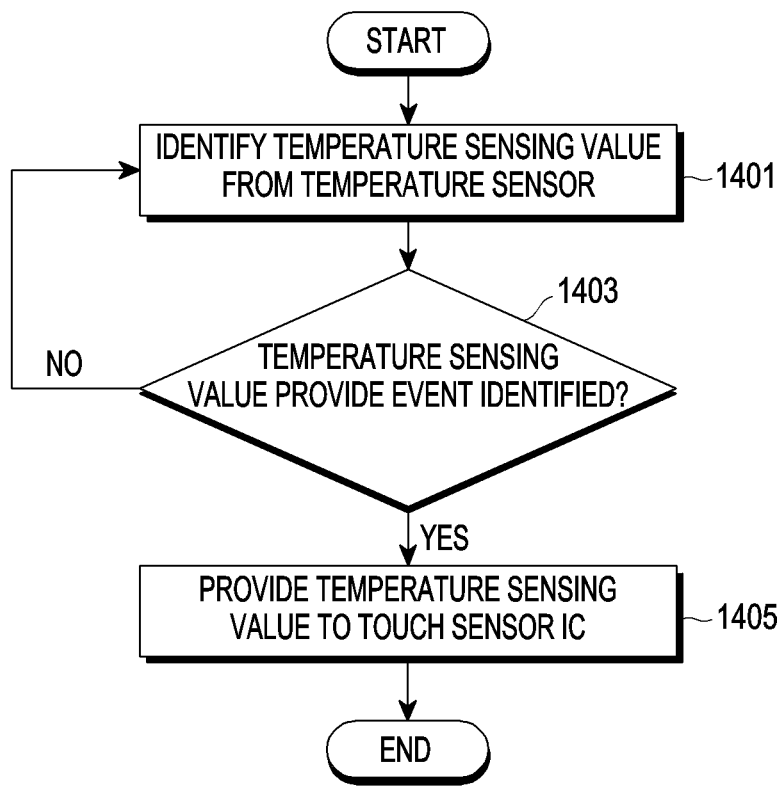
FIG. 14 is a flowchart illustrating an operation method of an electronic device according to an embodiment.

FIG. 14 is a flowchart illustrating an operation method of an electronic device according to an embodiment.

According to an embodiment, the electronic device 101 (e.g., the processor 120) may identify the temperature sensing value from the temperature sensor. The electronic device 101 may identify the temperature sensing value from the temperature sensor periodically or if the temperature is changed. In operation 1403, the electronic device 101 may identify whether a temperature sensing value provide event occurs. If the temperature sensing value provide event is identified (Yes in 1403), the electronic device 101 may provide the temperature sensing value to the touch sensor IC in operation 1405. If the temperature sensing value provide event is not is identified (No in 1405), the electronic device 101 may refrain from transferring the temperature sensing value. In an embodiment, the temperature sensing value may be provided directly from the temperature sensor to the touch sensor IC. When the temperature sensing value provide event occurs, the electronic device 101 may notify the temperature sensor of the same, and the temperature sensor receiving the notification may provide the temperature sensing value directly to the touch sensor IC. Alternatively, the temperature sensor may directly detect the temperature sensing value provide event and, upon detecting the event, may directly provide the temperature sensing value to the touch sensor IC. In an embodiment, the electronic device 101 may detect a temperature sensing value provide event and then sense the temperature. In this case, the temperature sensor may be notified of the detection of the temperature sensing value provide event from the processor 120 or may direct detect it. If the temperature sensing value provide event is detected, the temperature sensor may sense the temperature and provide the sensed temperature sensing value to the touch sensor IC directly or via the processor 120.

According to an embodiment, if a finger on display (FoD) event is identified, the electronic device 101 may determine that a temperature sensing value provide event has occurred. For example, if a touch is identified on a designated area of the touch sensor 251, the electronic device 101 may identify that a temperature sensing value provide event has occurred. The designated area may be, e.g., an area represented as an area requiring a finger contact for fingerprint sensing, but is not limited thereto. For example, if it is identified that the identified touch is maintained for a designated period or longer, the electronic device 101 may determine that a temperature sensing value provide event has occurred. In an embodiment, if switching from the low power mode to a normal power mode, the electronic device 101 may identify that a temperature sensing value provide event has occurred. For example, the electronic device 101 may identify the low power mode when the display is turned off or in the always on display (AOD) mode. Upon identifying an input set to turn on the turned-off display or an input set to escape from the AOD mode, the electronic device 101 may identify that a temperature sensing value provide event has occurred. In an embodiment, if it is determined that the current temperature is different from the existing temperature in the normal power mode, the electronic device 101 may identify that a temperature sensing value provide event has occurred. For example, if the difference between the current temperature and the existing temperature is equal to or greater than a threshold difference, the electronic device 101 may identify that the temperature sensing value provide event has occurred. The above-described temperature sensing is value provide event is merely exemplary, and there is no limitation.

Figure 15:
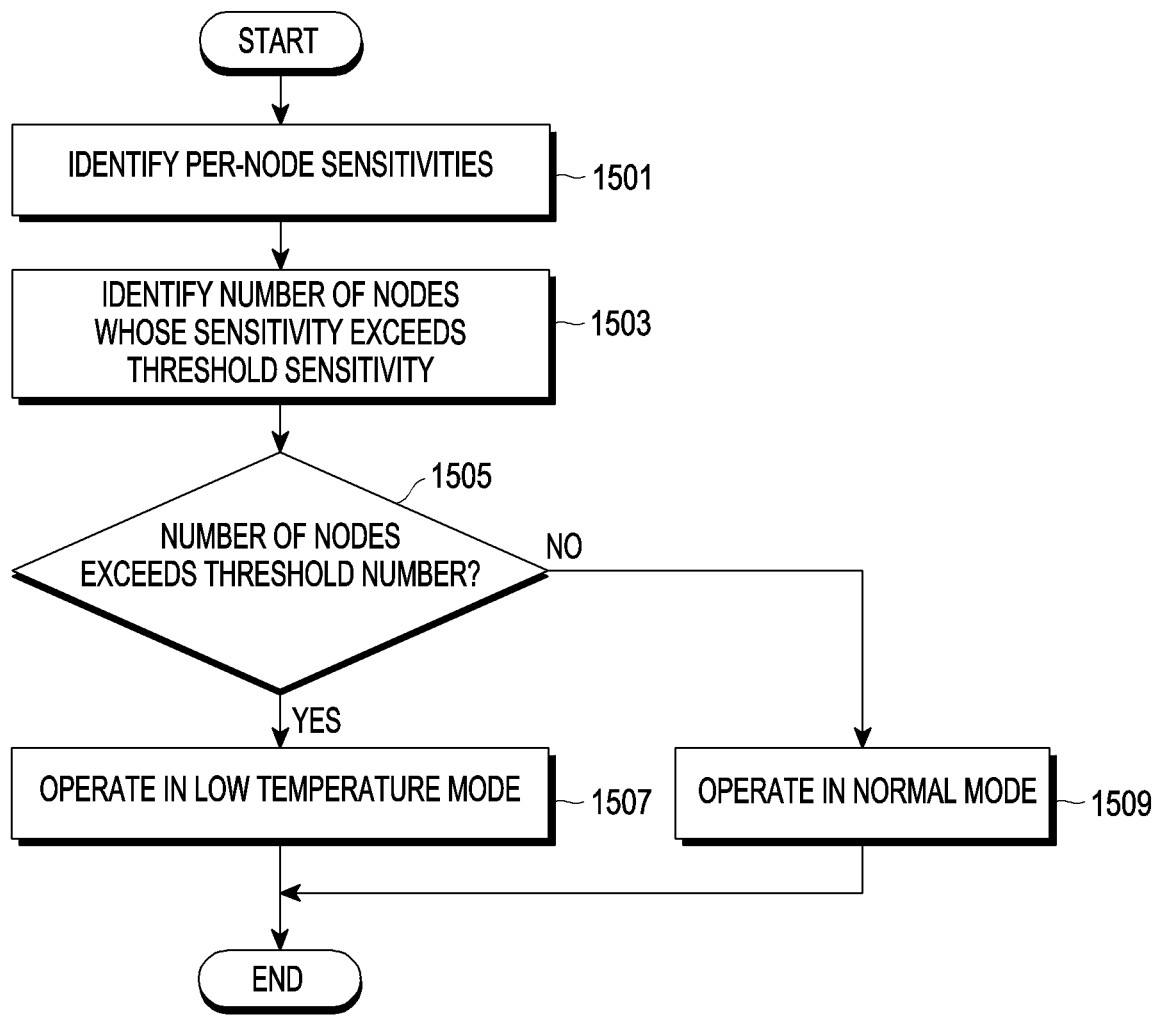
FIG. 15 is a flowchart illustrating an operation method of an electronic device according to an embodiment.
Figure 16:
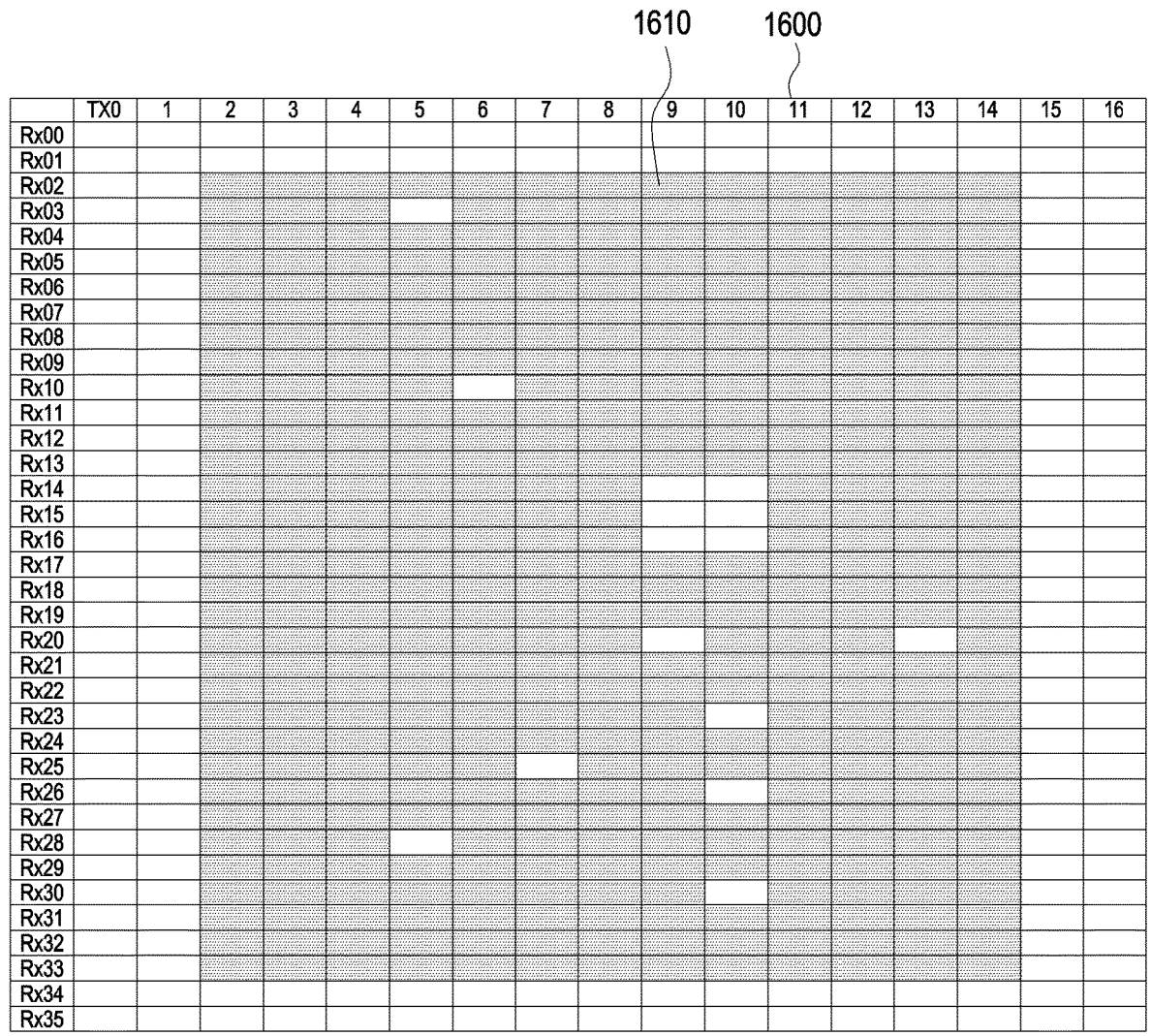
FIG. 16 illustrates per-node sensitivities according to an embodiment.

FIG. 15 is a flowchart illustrating an operation method of an electronic device according to an embodiment. The embodiment of FIG. 15 is described with reference to FIG. 16. FIG. 16 illustrates per-node sensitivities according to an embodiment.

According to an embodiment, the electronic device 101 (e.g., the touch sensor IC 253) may identify per-node sensitivities in operation 1501. In FIG. 15, even when not receiving temperature information from the outside (e.g., the processor 120 or the temperature sensor), the touch sensor IC 253 may identify whether it is in the low temperature state based on touch sensing information (e.g., per-node sensitivities). The touch sensor IC 253 may identify the sensitivity for each node by identifying raw data or subtracting the baseline from the raw data. For example, the touch sensor IC 253 may identify the sensitivity of the plurality of nodes 1600 as illustrated in FIG. 16. In operation 1503, the touch sensor IC 253 may identify the number of nodes whose sensitivity exceeds a designated threshold sensitivity. In operation 1505, the touch sensor IC 253 may identify whether the number of nodes having a sensitivity exceeding the designated threshold sensitivity (e.g., 300) exceeds a threshold number. In FIG. 16, nodes 1610 with sensitivities exceeding the threshold sensitivity are shown differently from the other nodes (nodes with sensitivities below the threshold sensitivity). For example, the electronic device 101 may identify that the number of nodes 1610 having a sensitivity exceeding the threshold sensitivity in FIG. 16 exceeds the threshold number. If it is identified that the number of nodes having a sensitivity exceeding the designated threshold sensitivity exceeds the threshold number (Yes in 1505), the touch sensor IC 253 may operate in the low temperature mode in operation 1507. If it is identified that the number of nodes having a sensitivity exceeding the designated threshold sensitivity is equal to or less than the threshold number (No in 1505), the touch sensor IC 253 may operate in the normal mode in operation 1509. In the low temperature mode, as described above, the touch sensor IC 253 may disregard the touch if the sensitivity less than the designated size occurs within the threshold time occurs. As described above, the touch sensor IC 253 may identify whether it is in the low temperature state even without directly receiving temperature information. In the normal mode, the touch sensor IC 253 may process a touch having non-zero sensitivity without any particular limitation.

In an embodiment, the electronic device 101 may identify the number of nodes having sensitivity exceeding the designated threshold sensitivity, but only for some of the nodes. For example, in the embodiment of FIG. 16, the electronic device 101 may not determine is whether the sensitivity exceeds the threshold sensitivity, for the nodes included in the two left channels, two right channels, two upper channels, and two lower channels. The electronic device 101 may identify whether the sensitivity exceeds the threshold sensitivity, only for nodes within a designated range, and may identify whether it is in the low temperature state based on the number of nodes selected from the designated range.

According to an embodiment, the electronic device 101 may identify whether it is in the low temperature state based on the shape of the nodes, rather than the number of nodes having sensitivity exceeding the threshold sensitivity. For example, the electronic device 101 may identify the type of the contacted body part (e.g., the user's finger, palm, or ear) based on the horizontal-vertical ratio and size of the group formed by the nodes having sensitivity exceeding the threshold sensitivity. The electronic device 101 may store a reference form of the form identified at low temperature (e.g., nodes 1610 in FIG. 16). The electronic device 101 may compare the identified shape with the reference shape, and may identify whether it is in the low temperature state based on the result of comparison. According to an embodiment, the electronic device 101 may identify whether it is in the low temperature state based on both the shape of the nodes and the number of nodes having a sensitivity exceeding the threshold sensitivity.

In an embodiment, the touch sensor IC 253 may identify whether it is in the low temperature state by using the temperature information received from the outside and the per-node sensitivities.

Figure 17:
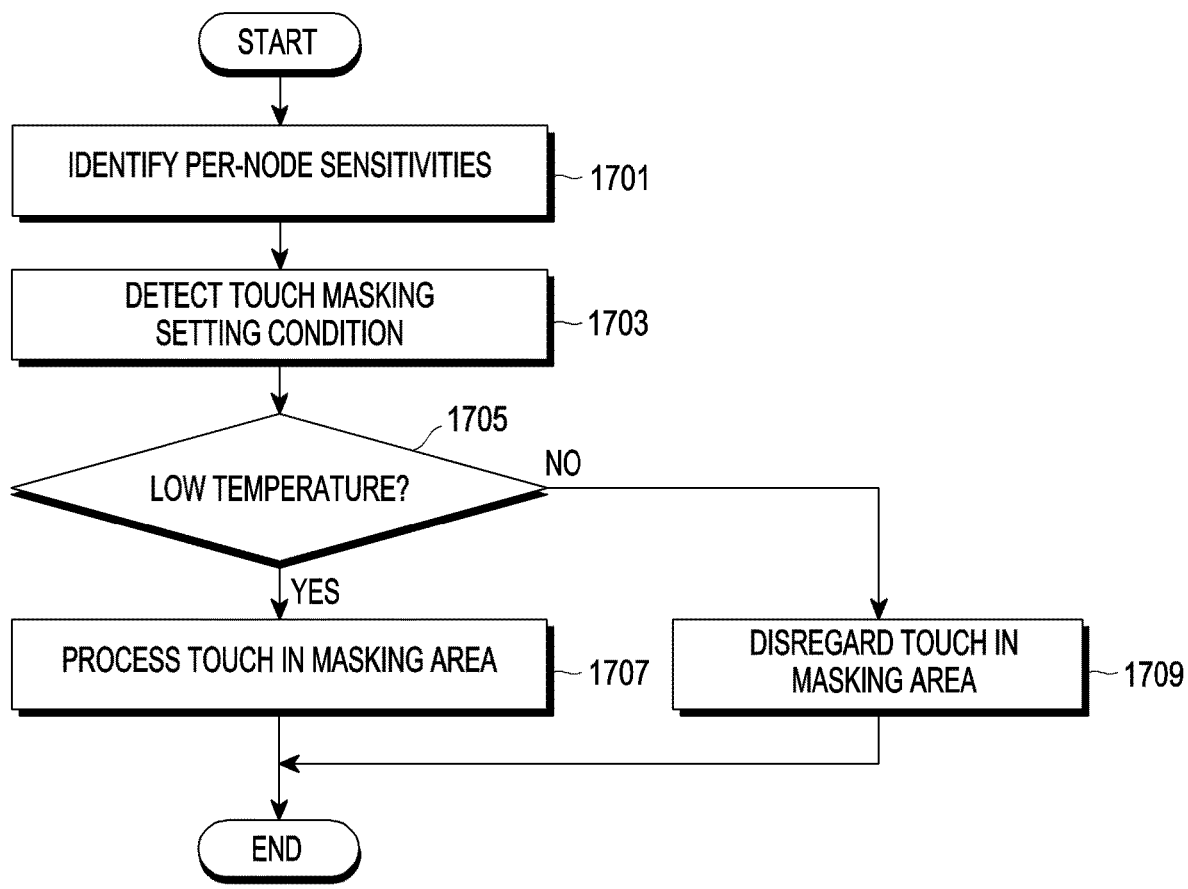
FIG. 17 is a flowchart illustrating an operation method of an electronic device according to an embodiment.
Figure 18:
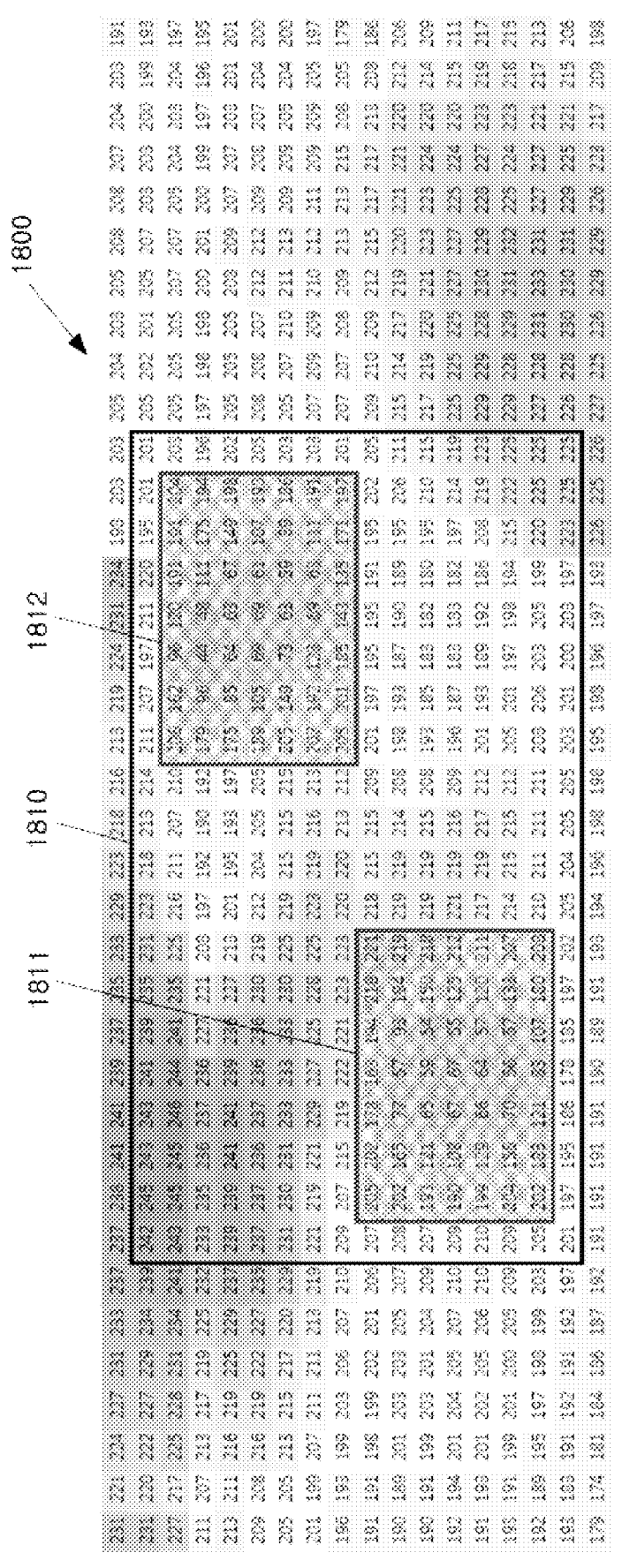

FIG. 17 is a flowchart illustrating an operation method of an electronic device according to an embodiment. The embodiment of FIG. 17 is described with reference to FIG. 18. FIG. 18 illustrates per-node sensitivities of a baseline according to an embodiment.

According to an embodiment, the electronic device 101 (e.g., the touch sensor IC 253) may identify per-node sensitivities in operation 1701. In operation 1703, the electronic device 101 may detect a touch masking setting condition. The electronic device 101 may previously store a touch masking setting condition that is unrelated to temperature. For example, if the electronic device 101 is located in the user's pocket, the display may be touched by an object (e.g., a key) in the user's pocket. The electronic device 101 may store a touch masking setting condition that prevents an accidental object contact from being processed as described above. For example, when the electronic device 101 is located in a pocket, node groups 1811 and 1812 as illustrated in FIG. 18 may be formed, and the electronic device 101 may perform masking on the groups 1811 and 1812 and may set a baseline 1800 for excluding the node groups 1811 and 1812 of FIG. 18. For example, when the node groups 1811 and 1812 as illustrated in FIG. 18 are detected (or when the baseline 1800 is detected), the electronic device 101 may be configured to set a touch masking area 1810 including the groups 1811 and 1812 and to refrain from processing a touch detected in the masking area 1810.

If the touch masking setting condition is identified, the electronic device 101 may identify whether it is in a low temperature state in operation 1705. The electronic device 101 may identify whether it is in the low temperature state, e.g., based on a sensing value from the temperature sensor or based on per-node sensitivities. If it is identified that it is in the low temperature state (Yes in 1705), the electronic device 101 may process touches (e.g., 1811 and 1812) in the masking area 1810 in operation 1707. If it is identified that it is not in the low temperature state (No in 1705), the electronic device 101 may disregard touches in the masking area in operation 1709. As a temperature-independent touch masking setting condition is operated, there is a possibility that normal touches in the low temperature state is masked. A touch in the low temperature state may be similar to the group shape of the touch masking setting condition set in, e.g., the pocket environment. The electronic device 101 may operate so that a touch in the low temperature state is not disregarded by the masking setting condition which is not related to temperature. Accordingly, if a masking setting condition is identified, the electronic device 101 may identify whether it is in the low temperature state and disregard touches in the masking area (e.g., 1810) if it is not the low temperature state while processing touches in the masking area (e.g., 1810) if it is in the low temperature state. In an embodiment, if it is identified that it is in the low temperature state, the electronic device 101 may release the temperature-independent touch masking setting condition. Accordingly, the masking area may also be released, and the electronic device 101 may process touches detected in the masking area.

According to certain embodiments, an electronic device 101 may comprise a temperature sensor 301 configured to sense temperature information of the electronic device 101, a processor 120, and a touch circuit 250. The touch circuit 250 may be configured to identify that the temperature information sensed by the temperature sensor 301 is lower than or equal to a designated threshold temperature and identify whether values included in a designated number of frames of touch sensing information are within a designated range based on the temperature information being lower than or equal to the designated threshold temperature. Each frame of the touch sensing information may include a plurality of values each corresponding to one of a plurality of nodes of the touch circuit 250. The touch circuit 250 may be configured to refrain is from outputting, to the processor 120, touch information associated with at least one first node having a value within the designated range among the plurality of nodes, based on a result of identifying whether the values included in the designated number of frames of touch sensing information are within the designated range. The touch circuit 250 may be configured to output, to the processor 120, touch information associated with at least one second node having a value outside the designated range among the plurality of nodes, based on the result of identifying whether the values included in the designated number of frames of touch sensing information are within the designated range.

According to certain embodiments, the touch circuit 250 may be configured to identify whether the values included in the designated number of frames of touch sensing information is lower than or equal to a designated threshold, as at least part of identifying whether the values included in the designated number of frames of touch sensing information are within the designated range.

According to certain embodiments, the touch circuit may be further configured to obtain additional touch sensing information after obtaining the designated number of frames of touch sensing information. The values corresponding to the at least one first node in the additional touch sensing information may be outside the designated range. The touch circuit 250 may refrain from outputting, to the processor 120, the additional touch sensing information associated with the at least one first node.

According to certain embodiments, the touch circuit 250 may be further configured to sequentially obtain a plurality of raw data each of which corresponds to one of the designated number of frames of touch sensing information. The designated number of frames of touch sensing information may be based on differences between each of the plurality of raw data and a baseline used as a reference.

According to certain embodiments, the touch circuit 250 may be further configured to update the baseline based on at least part of the plurality of raw data corresponding to the designated number frames of touch sensing information, after refraining from outputting, to the processor 120, the touch information associated with the at least one first node.

According to certain embodiments, the touch circuit 250 may be further configured to obtain additional raw data after obtaining the plurality of raw data, obtain additional touch sensing information, based on a difference between the additional raw data and the updated baseline, and stop refraining from outputting the touch information associated with the at least one first node and output, to the processor 120, touch information associated with the additional raw data, based on values included in the additional touch sensing information.

According to certain embodiments, the touch circuit 250 may be further configured to stop refraining from outputting the touch information associated with the at least one first node, based on elapse of a designated time period after identifying that the temperature information is lower than or equal to the designated threshold temperature.

According to certain embodiments, the touch circuit 250 may be configured to, as part of identifying that the temperature information sensed by the temperature sensor 301 is lower than or equal to the designated threshold temperature, receive, from the processor 120, the temperature information obtained by the processor 120 from the temperature sensor 301 and identify that the temperature information is lower than or equal to the designated threshold temperature.

According to certain embodiments, the touch circuit 250 may be configured to, as part of identifying that the temperature information sensed by the temperature sensor 301 is lower than or equal to the designated threshold temperature, receive the temperature information from the temperature sensor 301 and identify that the temperature information is lower than or equal to the designated threshold temperature.

According to certain embodiments, the touch circuit 250 may be configured to, as part of identifying that the temperature information sensed by the temperature sensor 301 is lower than or equal to the designated threshold temperature, receive, from the processor 120, an indication that the temperature information is lower than or equal to the designated threshold temperature. The processor 120 may be configured to obtain the temperature information from the temperature sensor 301 and identify that the temperature information is lower than or equal to the designated threshold temperature.

According to certain embodiments, the plurality of values each corresponding to one of the plurality of nodes of the touch circuit (e.g., the touch circuit 250) may include a plurality of sensitivities each corresponding to one of the plurality of nodes and/or a plurality of capacitance change amounts each corresponding to one of the plurality of nodes.

According to certain embodiments, the processor 120 may be configured to receive the temperature information from the temperature sensor, identify whether to provide the temperature information to the touch circuit, and provide the temperature information to the touch circuit (e.g., the touch circuit 250), based on identifying that the temperature information is to be provided to the touch circuit.

According to certain embodiments, the processor 120 may be configured to identify to provide the temperature information to the touch circuit (e.g., the touch circuit 250), based on identifying an occurrence of a touch to a designated area of the touch circuit, a switch from a low power mode to a normal power mode, and/or detection of a temperature change.

According to certain embodiments, the touch circuit (e.g., the touch circuit 250) may be configured to output, to the processor 120, based on identifying that a designated time period is exceeded or the temperature information exceeds a threshold temperature, additional touch information associated with a node having a value within the designated range. The additional touch information may be obtained after elapse of the designated time period or after temperature information exceeds the threshold temperature.

According to certain embodiments, an electronic device 101 may comprise a processor 120 and a touch circuit (e.g., the touch circuit 250). The touch circuit (e.g., the touch circuit 250) may identify whether it is in a low temperature state based on at least one obtained first touch sensing information and identify whether values included in a designated number of frames of touch sensing information are within a designated range. Each of the touch sensing information may include a plurality of values each corresponding to one of a plurality of nodes of the touch circuit. The touch circuit (e.g., the touch circuit 250) may be configured to refrain from outputting, to the processor, touch information associated with at least one first node having a value within the designated range among the plurality of nodes, based on a result of identifying whether the values included in the designated number of frames of touch sensing information are within the designated range and to output, to the processor, touch information associated with at least one second node having a value outside the designated range among the plurality of nodes, based on the result of identifying whether the values included in the designated number of frames of touch sensing information are within the designated range.

According to certain embodiments, the touch circuit (e.g., the touch circuit 250) may be configured to identify that it is in the low temperature state if the number of nodes having sensitivity exceeding a designated threshold sensitivity in the at least one first touch sensing information exceeds a threshold number.

According to certain embodiments, the touch circuit (e.g., the touch circuit 250) may identify that it is in the low temperature state if the number of nodes having sensitivity exceeding the designated threshold sensitivity among a plurality of nodes in a designated area exceeds the threshold number.

According to certain embodiments, the touch circuit 250 may include a touch sensor 251 including a plurality of electrodes and a touch sensor IC 253. The touch sensor IC 253 may be configured to identify whether values included in a designated number of frames of touch sensing information are within a designated range, based on identifying that a condition indicating the low temperature state is met. Each of the touch sensing information includes a plurality of values each corresponding to one of the plurality of nodes of the touch circuit 250. Each of the touch sensing information may be identified based on differences between raw data associated with signals output from the plurality of electrodes from the touch sensor and a baseline used as a reference. The touch sensor IC 253 may be configured to refrain from outputting touch information associated with at least one first node having a value within the designated range among the plurality of nodes, based on a result of identifying whether the values included in the designated number of frames of touch sensing information are within the designated range. The touch sensor IC 253 may be configured to output touch information associated with at least one second node having a value outside the designated range among the plurality of nodes, based on the result of identifying whether the values included in the designated number of frames of touch sensing information are within the designated range.

According to certain embodiments, the touch circuit 250 may be further configured to identify whether a condition indicating the low temperature state is met based on data received from an external electronic device 101.

According to certain embodiments, the touch circuit 250 may be further configured to identify whether a condition indicating the low temperature state is met based on whether at least one capacitance among the plurality of electrodes meets a designated capacitance condition.

According to certain embodiments, the plurality of values each corresponding to one of the plurality of nodes of the touch circuit (e.g., the touch circuit 250) may include at least one of a plurality of sensitivities each corresponding to one of the plurality of nodes or a plurality of capacitance change amounts each corresponding to one of the plurality of nodes.

According to certain embodiments of the disclosure, the electronic device may be various types of devices. The electronic device may include, for example, a portable communication device (e.g., a smart phone), a computer device, a portable multimedia device, a portable medical device, a camera, a wearable device, or a home appliance. According to an is embodiment of the disclosure, the electronic device is not limited to the above-described devices.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., an electronic device). For example, a processor of the machine (e.g., an electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a temperature sensor configured to sense temperature information of the electronic device;
   a processor; and
   a touch circuit, wherein the touch circuit is configured to:
      identify that the temperature information sensed by the temperature sensor is lower than or equal to a designated threshold temperature,
      identify a low temperature mode, and identify whether values included in a designated number of frames of touch sensing information are within a designated range in the low temperature mode based on the temperature information being lower than or equal to the designated threshold temperature, each frame of the touch sensing information including a plurality of values each corresponding to one of a plurality of nodes of the touch circuit,
      refrain from outputting, to the processor, touch information associated with at least one first node having a value within the designated range among the plurality of nodes, based on identifying that the values included in the designated number of frames of touch sensing information are within the designated range, and
      output, to the processor, touch information associated with at least one second node having a value outside the designated range among the plurality of nodes, based on identifying that the values included in the designated number of frames of touch sensing information are outside the designated range.

2. The electronic device of claim 1, wherein the touch circuit is configured to identify whether the values included in the designated number of frames of touch sensing information is lower than or equal to a designated threshold, as at least part of identifying whether the values included in the designated number of frames of touch sensing information are within the designated range.

3. The electronic device of claim 1, wherein the touch circuit is further configured to:
   obtain additional touch sensing information after obtaining the designated number of frames of touch sensing information, wherein values corresponding to the at least one first node in the additional touch sensing information is outside the designated range, and
   refrain from outputting, to the processor, the additional touch sensing information associated with the at least one first node.

4. The electronic device of claim 1, wherein the touch circuit is further configured to:
   sequentially obtain a plurality of raw data each of which corresponds to one of the designated number of frames of touch sensing information, wherein the designated number of frames of touch sensing information are based on differences between each of the plurality of raw data and a baseline used as a reference.

5. The electronic device of claim 4, wherein the touch circuit is further configured to update the baseline based on at least part of the plurality of raw data corresponding to the designated number of frames of touch sensing information, after refraining from outputting, to the processor, the touch information associated with the at least one first node.

6. The electronic device of claim 5, wherein the touch circuit is further configured to:
obtain additional raw data after obtaining the plurality of raw data,
obtain additional touch sensing information, based on a difference between the additional raw data and the updated baseline, and
stop refraining from outputting the touch information associated with the at least one first node and output, to the processor, touch information associated with the additional raw data, based on values included in the additional touch sensing information.

7. The electronic device of claim 1, wherein the touch circuit is further configured to stop refraining from outputting the touch information associated with the at least one first node, based on elapse of a designated time period after identifying that the temperature information is lower than or equal to the designated threshold temperature.

8. The electronic device of claim 1, wherein the touch circuit is configured to, as part of identifying that the temperature information sensed by the temperature sensor is lower than or equal to the designated threshold temperature, receive, from the processor, the temperature information obtained by the processor from the temperature sensor and identify that the temperature information is lower than or equal to the designated threshold temperature.

9. The electronic device of claim 1, wherein the touch circuit is configured to, as part of identifying that the temperature information sensed by the temperature sensor is lower than or equal to the designated threshold temperature, receive the temperature information from the temperature sensor and identify that the temperature information is lower than or equal to the designated threshold temperature.

10. The electronic device of claim 1, wherein the touch circuit is configured to, as part of identifying that the temperature information sensed by the temperature sensor is lower than or equal to the designated threshold temperature, receive, from the processor, an indication that the temperature information is lower than or equal to the designated threshold temperature, wherein the processor is configured to obtain the temperature information from the temperature sensor and identify that the temperature information is lower than or equal to the designated threshold temperature.

11. The electronic device of claim 1, wherein the plurality of values each corresponding to one of the plurality of nodes of the touch circuit include a plurality of sensitivities each corresponding to one of the plurality of nodes and/or a plurality of capacitance change amounts each corresponding to one of the plurality of nodes.

12. The electronic device of claim 1, wherein the processor is configured to:
receive the temperature information from the temperature sensor,
identify whether to provide the temperature information to the touch circuit, and
provide the temperature information to the touch circuit, based on identifying that the temperature information is to be provided to the touch circuit.

13. The electronic device of claim 12, wherein the processor is configured to identify to provide the temperature information to the touch circuit, based on identifying an occurrence of a touch to a designated area of the touch circuit, a switch from a low power mode to a normal power mode, and/or detection of a temperature change.

14. The electronic device of claim 1, wherein the touch circuit is configured to output to the processor, based on identifying that a designated time period is exceeded or the temperature information exceeds a threshold temperature, additional touch information associated with a node having a value within the designated range, wherein the additional touch information is obtained after elapse of the designated time period or after temperature information exceeds the threshold temperature.

15. A method of operation of an electronic device including a temperature sensor, a processor, and a touch circuit, the method comprising:
identifying that temperature information sensed by the temperature sensor is lower than or equal to a designated threshold temperature,
identifying a low temperature mode, and identifying whether values included in a designated number of frames of touch sensing information are within a designated range in the low temperature mode based on the temperature information being lower than or equal to the designated threshold temperature, each frame of the touch sensing information including a plurality of values each corresponding to one of a plurality of nodes of the touch circuit,
refraining from outputting, to the processor, touch information associated with at least one first node having a value within the designated range among the plurality of nodes, based on identifying that the values included in the designated number of frames of touch sensing information are within the designated range, and
outputting, to the processor, touch information associated with at least one second node having a value outside the designated range among the plurality of nodes, based on identifying that the values included in the designated number of frames of touch sensing information are outside the designated range.

16. The method of claim 15, further comprising sequentially obtaining a plurality of raw data each of which corresponds to one of the designated number of frames of touch sensing information, wherein the designated number of frames of touch sensing information are based on differences between each of the plurality of raw data and a baseline used as a reference.

17. The method of claim 16, further comprising updating the baseline based on at least part of the plurality of raw data corresponding to the designated number of frames of touch sensing information, after refraining from outputting, to the processor, the touch information associated with the at least one first node.

18. The method of claim 17, further comprising:
obtaining additional raw data after obtaining the plurality of raw data;
obtaining additional touch sensing information, based on a difference between the additional raw data and the updated baseline; and
outputting, to the processor, touch information associated with the additional raw data, based on values included in the additional touch sensing information.

19. The method of claim 15, further comprising:
stopping refraining from outputting the touch information associated with the at least one first node, based on elapse of a designated time period after identifying that the temperature information is lower than or equal to the designated threshold temperature.

20. The method of claim 15, wherein the plurality of values each corresponding to one of the plurality of nodes of the touch circuit include a plurality of sensitivities each corresponding to one of the plurality of nodes and/or a plurality of capacitance change amounts each corresponding to one of the plurality of nodes.

\* \* \* \* \*